(12) United States Patent
Nakamura

(10) Patent No.: US 11,029,935 B2
(45) Date of Patent: Jun. 8, 2021

(54) ON-BOARD UPDATE DEVICE AND ON-BOARD UPDATE SYSTEM

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Souichi Nakamura, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 170 days.

(21) Appl. No.: 16/327,998

(22) PCT Filed: Aug. 14, 2017

(86) PCT No.: PCT/JP2017/029285
§ 371 (c)(1),
(2) Date: Feb. 25, 2019

(87) PCT Pub. No.: WO2018/043107
PCT Pub. Date: Mar. 8, 2018

(65) Prior Publication Data
US 2019/0193653 A1    Jun. 27, 2019

(30) Foreign Application Priority Data

Aug. 30, 2016 (JP) ............................. JP2016-168382
Mar. 22, 2017 (JP) ................................. 2017-056007

(51) Int. Cl.
*G06F 8/65* (2018.01)
*B60R 16/023* (2006.01)
(Continued)

(52) U.S. Cl.
CPC ............ *G06F 8/65* (2013.01); *B60R 16/0232* (2013.01); *G06F 1/24* (2013.01); *G06F 1/3212* (2013.01);
(Continued)

(58) Field of Classification Search
CPC ....... B60R 16/0232; G06F 8/654; G06F 8/65; G06F 1/24; G06F 9/4893; G06F 9/4418; G06F 1/3212
See application file for complete search history.

(56) References Cited

U.S. PATENT DOCUMENTS

2016/0077827 A1* 3/2016 Throop .................... G06F 8/65
717/168
2017/0123784 A1* 5/2017 Zymeri ................. H04L 41/082

FOREIGN PATENT DOCUMENTS

| JP | 2011-000894 A | 1/2011 |
| JP | 2011-070287 A | 4/2011 |
| JP | 2013-084143 A | 5/2013 |

OTHER PUBLICATIONS

International Search Report, Application No. PCT/JP2017/029285, dated Sep. 26, 2017.

* cited by examiner

*Primary Examiner* — Jacob D Dascomb
(74) *Attorney, Agent, or Firm* — Honigman LLP

(57) ABSTRACT

An on-board update device and an on-board update system provided herein may prevent a decrease in the electric power charged in the battery caused by an update. An on-board update device has an update processing unit configured to update a program stored in a storage unit of a communication device. The on-board update device includes: an update information acquisition unit; a required electric power estimation unit; and a battery level acquisition unit acquires an amount of electric power charged in the battery. The update
(Continued)

processing unit performs an update process in consideration of the amount of electric power estimated by the required electric power estimation unit, the amount of electric power acquired by the battery level acquisition unit, and a priority level of the update program or data acquired by the update information acquisition unit.

7 Claims, 14 Drawing Sheets

(51) Int. Cl.
  *H04L 29/12* (2006.01)
  *G06F 9/48* (2006.01)
  *G06F 8/654* (2018.01)
  *G06F 1/24* (2006.01)
  *G06F 1/3212* (2019.01)
  *G06F 9/4401* (2018.01)
(52) U.S. Cl.
  CPC ............ *G06F 8/654* (2018.02); *G06F 9/4893* (2013.01); *H04L 61/6027* (2013.01); *G06F 9/4418* (2013.01)

FIG. 13

```
                    Program update information

Update              Required            Authorization
      program name         update time           to update
                                                              ─── 71

Program A    :    Update time  0 : 5 0       ☐

Program B    :    Update time  3 : 0 0       ☑

Program C    :    Update time  1 : 0 0       ☑

Program D    :    Update time  0 : 3 0       ☐

Program E    :    Update time  2 : 0 0       ☐
                       72                                    73
                       [ Start update ]           [ Cancel ]
```

ON-BOARD UPDATE DEVICE AND ON-BOARD UPDATE SYSTEM

CROSS-REFERENCE TO RELATED APPLICATIONS

This application is the U.S. national stage of PCT/JP2017/029285 filed Aug. 14, 2017, which claims priority of Japanese Patent Application No. JP 2016-168382 filed Aug. 30, 2016 and Japanese Patent Application No. JP 2017-056007 filed Mar. 22, 2017.

TECHNICAL FIELD

The present disclosure relates to an on-board update device and an on-board update system for updating programs or data in communication devices installed in a vehicle.

BACKGROUND

Vehicles are conventionally equipped with a plurality of communication devices such as ECUs (Electronic Control Units), which are connected via communication lines such as CAN (Controller Area Network) buses and thereby capable of transmitting and receiving information to/from each other. In each ECU that is in charge of vehicle control or a similar process, a processor such as a CPU (Central Processing Unit) retrieves and executes a program stored in a storage unit such as a flash memory or EEPROM (Electrically Erasable Programmable Read Only Memory). The program or data stored in the storage unit of each ECU needs to be updated with a new program or data, for example, when required to add a function, to correct a fault, to upgrade, etc. In this case, an update program or data is transmitted via a communication line to the ECU to be updated.

JP 2011-70287A proposes a program update system. When a software program for in-vehicle use is updated after a driver leaves the vehicle with the engine running, a program update device sends monitoring information about the vehicle state to a center. Then, the center sends a command based on the monitoring information, and the program update device operates according to this command.

For safety considerations, a program or data update in an ECU of a vehicle needs to be done, for example, when the vehicle is parked. However, when the vehicle is parked with the engine stopped, the ECU has to operate on the electric power charged in a battery. If the program or data update in the ECU has seriously decreased the amount of electric power charged in the battery, various troubles may occur. For example, the vehicle may not be able to start the engine after the update.

An object of the present disclosure, made in view of such circumstances, is to provide an on-board update device and an on-board update system that can prevent a serious decrease in the amount of electric power charged in the battery caused by an update process.

SUMMARY

An on-board update device according to an aspect of the present disclosure has an update processing unit configured to update a program or data stored in a storage unit of a communication device installed in a vehicle. The on-board update device includes: an update information acquisition unit configured to acquire an update program or data from a device outside the vehicle; a required electric power estimation unit configured to estimate an amount of electric power required for an update process using the update program or data acquired by the update information acquisition unit; and a battery level acquisition unit configured to acquire an amount of electric power charged in a battery of the vehicle. The update processing unit is configured to perform an update process in consideration of the amount of electric power estimated by the required electric power estimation unit, the amount of electric power acquired by the battery level acquisition unit, and a priority level of the update program or data acquired by the update information acquisition unit.

The on-board update device according to another aspect of the present disclosure further includes an update decision unit configured to decide whether the update process using the update program or data acquired by the update information acquisition unit is executable, in consideration of the amount of electric power acquired by the battery level acquisition unit and the amount of electric power estimated by the required electric power estimation unit. The update processing unit is configured to preferentially perform an update process using a high-priority update program or data, if the update decision unit decides that the update process using the high-priority update program or data is executable.

In the on-board update device according to another aspect of the present disclosure, if the update decision unit decides that the update process using the high-priority update program or data is not executable, the update processing unit is configured to suspend the update process using the high-priority update program or data, and also to suspend an update process using any update program or data having a lower priority than the high-priority update program or data.

In the on-board update device according to another aspect of the present disclosure, if the update decision unit decides that the update process using the high-priority update program or data is not executable, the update processing unit is configured to suspend the update process using the high-priority update program or data, and to perform an update process using an update program or data of a next highest priority, in accordance with a decision result by the update decision unit.

The on-board update device according to another aspect of the present disclosure further includes an update notification unit configured to provide information about the update program or data for the update process performed by the update processing unit. The update notification unit does not provide notification of an update program or data acquired by the update information acquisition unit but not used for an intended update process performed by the update processing unit.

The on-board update device according to another aspect of the present disclosure further includes an update authorization receiving unit configured to receive authorization of the update process using the program or data, in response to the notification from the update notification unit.

In the on-board update device according to another aspect of the present disclosure, the update notification unit provides a notification of a time required for the update process using the update program or data.

The on-board update device according to another aspect of the present disclosure further includes an update time calculation unit configured to calculate the time required for the update process using the update program or data. The update notification unit is configured to provide notification of the time calculated by the update time calculation unit.

In the on-board update device according to another aspect of the present disclosure, the update information acquisition unit is configured to acquire, from the device outside the vehicle, not only the update program or data but also information about the time required for the update process using the update program or data. The update notification unit is configured to provide notification of the time acquired by the update information acquisition unit.

In the on-board update device according to another aspect of the present disclosure, the update information acquisition unit includes an update storage unit configured to store the update program or data. The update storage unit is configured to delete an update program or data after an intended update process is complete, and to keep an update program or data acquired by the update information acquisition unit but not used for an intended update process by the update processing unit.

In the on-board update device according to another aspect of the present disclosure, if an update program or data is kept in the update storage unit, the update information acquisition unit is configured to decide whether to acquire a next update program or data from the device outside the vehicle, in consideration of a priority level of the update program or data kept in the update storage unit and free space on the update storage unit.

In the on-board update device according to another aspect of the present disclosure, if the update storage unit has insufficient free space and also if the priority level of the update program or data kept in the update storage unit is lower than a priority level of the next update program or data, the update information acquisition unit is configured to delete the update program or data kept in the update storage unit, to acquire the next update program or data from the device outside the vehicle, and to store the next update program or data in the update storage unit.

The on-board update device according to another aspect of the present disclosure further includes a non-update notification unit. If the update program or data not used for an intended update process is deleted from the update storage unit, the non-update notification unit is configured to notify the device outside the vehicle of this deletion.

An on-board update device according to still another aspect of the present disclosure has an update processing unit configured to update a program or data stored in a storage unit of a communication device installed in a vehicle. The on-board update device includes: an update information acquisition unit configured to acquire an update program or data from a device outside the vehicle; an update time calculation unit configured to calculate a time required for an update process using the update program or data; an update notification unit configured to provide notification of the time calculated by the update time calculation unit; and an update authorization receiving unit configured to receive authorization of the update process using the program or data, in response to the notification from the update notification unit.

An on-board update system according to an aspect of the present disclosure includes a plurality of communication devices installed in a vehicle, and an on-board update device having an update processing unit, the update processing unit being configured to update a program or data stored in a storage unit of each communication device. The on-board update device includes: an update information acquisition unit configured to acquire an update program or data from a device outside the vehicle; a required electric power estimation unit configured to estimate an amount of electric power required for an update process using the update program or data acquired by the update information acquisition unit; and a battery level acquisition unit configured to acquire an amount of electric power charged in a battery of the vehicle. The update processing unit is configured to perform an update process in consideration of the amount of electric power estimated by the required electric power estimation unit, the amount of electric power acquired by the battery level acquisition unit, and a priority level of the update program or data acquired by the update information acquisition unit. Each of the communication devices is configured to receive the update program or data from the on-board update device, and to perform an update by storing the received update program or data in the storage unit.

In the on-board update system according to another aspect of the present disclosure, the on-board update device further includes an update notification unit configured to provide information about the update program or data for the update process performed by the update processing unit. The update notification unit does not provide notification of an update program or data acquired by the update information acquisition unit but not used for an intended update process performed by the update processing unit.

In the on-board update system according to another aspect of the present disclosure, the on-board update device further includes an update time calculation unit configured to calculate a time required for the update process using the update program or data, and an update authorization receiving unit configured to receive authorization of the update process using the program or data, in response to the notification from the update notification unit. The update notification unit is configured to provide notification of the time calculated by the update time calculation unit.

In the present disclosure, the on-board update device performs the update processes of the programs or data in the plurality of communication devices installed in a vehicle. The on-board update device acquires update programs or data from the server device or a like device installed outside the vehicle. If more than one communication device needs updating, the on-board update device acquires an update program or data for each communication device. Alternatively, the on-board update device may apply a single update program or a single set of data to the update process of more than one communication device.

The on-board update device not only estimates the amount of electric power required for an update process for each of the acquired update programs or data, but also acquires information about the amount of electric power charged in the battery of the vehicle. The on-board update device performs the update processes of the communication devices, in consideration of the estimated amounts of required electric power, the amount of electric power charged in the battery, and the priority levels of the update programs or data. Regarding the priority levels of the programs or data, the on-board update device may be configured to acquire priority level information, for example, from the external device together with the programs or data, or may be configured, for example, to add priority levels by itself to the acquired programs or data.

Owing to this configuration, the on-board update device can preferentially perform update processes using high-priority programs or data, in consideration of the amount of electric power charged in the battery at the moment. Besides, the on-board update device can stop or postpone an update process if the on-board update device has decided, based on the amount of electric power charged in the battery, that the update process should be suspended.

Further in the present disclosure, the on-board update device decides whether an update process using an update program or data acquired from the external device is executable, in consideration of not only the amount of electric power charged in the battery but also the amount of electric power required to update the program or data. The on-board update device preferentially performs an update process using a high-priority update program or data that is decided to be executable in consideration of the charged amount and the required amount of electric power. Eventually, even if the amount of electric power charged in the battery is limited, the on-board update device preferentially performs an update process of higher priority.

Further in the present disclosure, if the on-board update device has decided that an update using a high-priority update program or data is not executable in consideration of the amount of electric power required for this update and the amount of electric power charged in the battery, the on-board update device suspends the update process using this high-priority update program or data and also suspends any update process using a lower-priority update program or data. In other words, the on-board update device keeps any lower-priority update process on standby until completion of the update process using the high-priority update program or data. In the case where, for example, a high-priority update process requires a large amount of electric power, this configuration can prevent the high-priority update process from being left on standby.

Alternatively, in the present disclosure, if the on-board update device has decided that an update using a high-priority update program or data is not executable in consideration of the amount of electric power required for this update and the amount of electric power charged in the battery, the on-board update device decides whether to perform an update process using an update program or data of the next highest priority. If the update program of the next highest priority is executable, the on-board update device performs this update process. This configuration can make the best use of the electric power charged in the battery to perform as many update processes as possible.

Further in the present disclosure, when an update process is to be performed, the on-board update device provides a notification of update-related information to a user of the vehicle or someone else. With this notification, a user of the vehicle or someone else can see the update state of the program or data in the communication devices installed in the vehicle. On the other hand, information on an update program or data for an update process to be suspended in consideration of the amount of electric power required for this update and the amount of electric power charged in the battery is not notified to a user or someone else, even if the on-board update device has acquired the update program or data from the external device. With this arrangement, a user is not bothered by unnecessary information (e.g. information about a program or data for a suspended update process). The program or data for a suspended update process may be informed later, when the amount of electric power charged in the battery increases sufficiently to enable the suspended update process.

Further in the present disclosure, the on-board update device provides a notification of one or more update processes to a user or someone else, and, in response to this notification, receives user's selective authorization of at least one update process using an update program. If any update process is authorized, the on-board update device performs the update process. If no update process is authorized, the on-board update device suspends every update process. For example, if a user intends to use the vehicle just when the user receives an update process or some time later, the user can select suspension of the update process and can use the vehicle without being disturbed by the update process.

If more than one update program or data is executable, the on-board update device may receive authorization of an update process one by one for every update program or data. This configuration can extend the range of user's selection.

Further in the present disclosure, the on-board update device notifies the user of the time required to perform an update process using an update program or data. The required update time can be calculated (estimated), for example, from information about the volume of update program or data, information about the processing speed of the communication device to be updated, and the like. The on-board update device may be configured to calculate the update time by itself or may be configured to acquire the update time from the external device.

Such notification allows a user to know, for example, the finish time of the update process, and to anticipate how long the vehicle is unavailable due to the update process. If more than one update program or data is executable, the on-board update device may provide notification of the required update time one by one for every update program or data. Such notification can provide a user with more specific information about the required update time for each update process.

In the case where the on-board update device is configured to receive authorization of each update process from a user, as described above, notification of the required update time can provide a user with helpful information for selective authorization of an update process.

Further in the present disclosure, the on-board update device stores every update program or data acquired from the external device in the update storage unit. The update storage unit is preferably a non-volatile storage unit. The on-board update device deletes any used update program from the update storage unit after the intended update process is complete, but keeps, in the update storage unit, any update program or data for an update process to be suspended in consideration of the amount of electric power required for the update and the amount of electric power charged in the battery. Later, when the amount of electric power charged in the battery increases sufficiently to enable the suspended update process, the on-board update device can perform the update process, without acquiring the update program or data from the external device again.

Further in the present disclosure, if the on-board update device which stores at least one update program or data in the update storage unit needs to acquire another update program or data from the external device, the on-board update device decides whether to acquire the new update program or data, in consideration of the free space on the update storage unit and the priority levels of the update programs or data.

For example, if the on-board update device needs to acquire another update program or data from the external device but does not have sufficient free space on the update storage unit, the on-board update device compares the priority level of each program or data stored in the update storage unit with the priority level of the program or data to be newly acquired. If the priority level of any program or data stored in the update storage unit is lower than the priority level of the program or data to be newly acquired, the on-board update device deletes the lower-priority update program or data stored in the update storage unit, acquires the new update program or data from the external device, and stores this new update program or data in the update storage unit.

Thereafter, the on-board update device notifies the external device that the lower-priority update program or data is deleted from the update storage unit and that an intended update has not been performed.

As described, when the on-board update device needs to acquire a new update program or data from the external device, the update storage unit may be occupied with one or more update programs or data for suspended update processes and may not have sufficient free space. In this situation, the above-described arrangements enable the on-board update device to decide whether to acquire the new update program or data, based on their priority levels. If the on-board update device has acquired and stored a high-priority new update program or data in the update storage unit and has deleted a lower-priority update program or data, the on-board update device notifies the external device of this deletion. Such notification enables the on-board update device to acquire the deleted update program or data later again.

Advantageous Effects of Disclosure

The present disclosure is configured to estimate the amount of electric power required for an update process using an update program or data acquired by the on-board update device from an external device, and to perform an update process of a communication device in consideration of the estimated amount of required electric power, the amount of electric power charged in the battery of the vehicle, and the priority level of the update program or data. This on-board update device can preferentially update a high-priority program or data, in consideration of the amount of electric power charged in the battery at the time. Eventually, it is possible to prevent a serious decrease in the amount of electric power charged in the battery caused by an update process.

BRIEF DESCRIPTION OF DRAWINGS

FIG. 13 is a schematic view that represents an example of an update information notification screen shown on a display device in the on-board update system according to Embodiment 2.

DETAILED DESCRIPTION OF PREFERRED EMBODIMENTS

Embodiment 1

Figure 1:
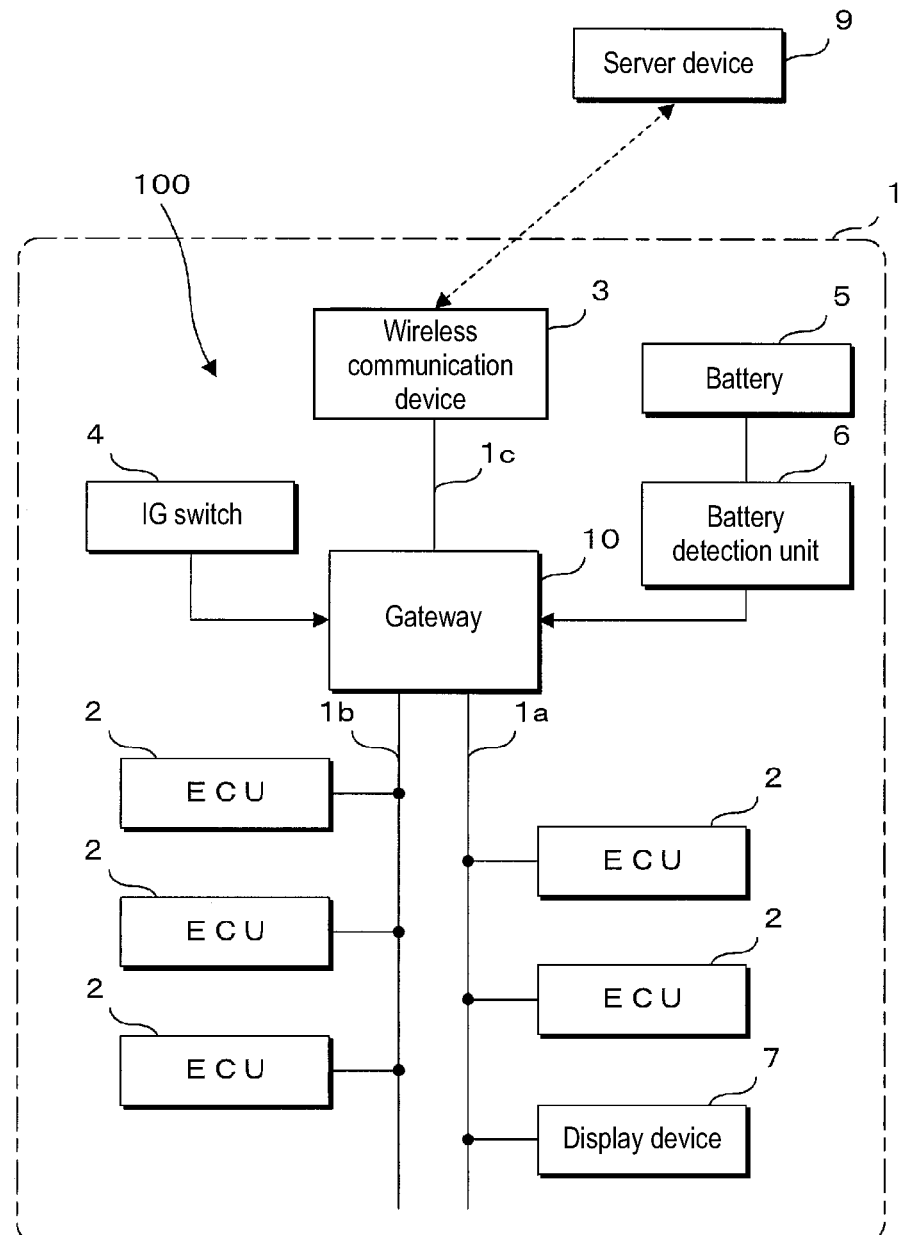
FIG. 1 is a schematic view showing the configuration of an on-board update system according to the Embodiments.

FIG. 1 is a schematic view showing the configuration of an on-board update system according to the Embodiments. In the on-board update system 100 according to the Embodiments, a vehicle 1 is equipped with a plurality of ECUs (Electronic Control Units) 2, which communicate with each other via communication lines 1a, 1b and a gateway 10 arranged in the vehicle 1. In the on-board update system 100 according to the Embodiments, the gateway 10 corresponds to an on-board update device, and the ECUs 2 correspond to communication devices. In the system configuration of the illustrated example, two ECUs 2 and a display device 7 are connected to the in-vehicle communication line 1a, and three ECUs 2 are connected to the in-vehicle communication line 1b, with the two communication lines 1a, 1b being connected to the gateway 10. The gateway 10 relays communication between the communication lines 1a, 1b and thereby enables mutual transmission and reception of data in all ECUs 2.

In the on-board update system 100 according to this embodiment, a wireless communication device 3 is also connected to the gateway 10 via a communication line 1c. Via the wireless communication device 3, the gateway 10 can communicate with a server device 9 installed outside the vehicle 1. The gateway 10 further receives an IG signal from an IG switch 4 in the vehicle 1 and a detection result from a battery detection unit 6 that detects the amount of electric power charged in a battery 5 of the vehicle 1.

The ECUs 2 may include various kinds of ECUs such as an ECU that controls the engine operation of the vehicle 1, an ECU that controls locking/unlocking of the doors, an ECU that turns the lighting on/off, an ECU that controls the airbag operation, and an ECU that controls the ABS (Antilock Brake System) operation. Each ECU 2 is connected to the communication line 1a or 1b arranged in the vehicle 1, and is capable of transmitting data to and receiving data from the other ECUs 2 and the gateway 10 via the communication lines 1a, 1b.

The wireless communication device 3 can transmit information to and receive information from the server device 9, for example, by wireless communication on a mobile telephone communication network, a wireless LAN (Local Area Network), or the like. The wireless communication device 3, which is connected to the gateway 10 via the communication line 1c, can transmit information to and receive information from the gateway 10 by wired communication. Thus, the wireless communication device 3 can relay the communication between the gateway 10 and the server device 9, by transmitting the data provided from the gateway 10 to the server device 9 and providing the data received from the server device 9 to the gateway 10.

The gateway 10 is connected with the communication lines 1a-1c that constitute an in-vehicle network for the vehicle 1, and relays data transmitted and received on these communication lines. In the example of FIG. 1, the gateway 10 is connected with three communication lines 1a-1c, namely, the first communication line 1a connected with two ECUs 2 and a display device 7, the second communication line 1b connected with three ECUs 2, and the third communication line 1c connected with the wireless communication device 3. The gateway 10 relays data by receiving data from any of the communication lines 1a-1c and transmitting the received data to the other communication lines 1a-1c.

The IG switch 4, which is a user-operated switch to start the engine of the vehicle 1 or to perform a like operation, changes over between two states, i.e., between on and off. In the Embodiments, the IG signal indicates the state of the IG switch 4. When the IG signal indicates on, the motor of the vehicle 1 (e.g., an engine) is in operation, and an alternator or the like is generating power. When the IG signal indicates off, the motor of the vehicle 1 is not in operation, and an alternator or the like generates no power. The battery detection unit 6 detects the amount of electricity charged in the battery 5, for example, based on the voltage value at the output terminal of the battery 5 and/or the accumulated value of the input/output current at the battery 5. The display device 7 is, for example, a liquid crystal display or the like. On receiving a display command or the like from an ECU 2 or the gateway 10, the display device 7 shows a message or the like to a user of the vehicle 1. The display device 7 has an operation unit such as a touchscreen or hardware keys (not shown) for receiving a user's operation, and notifies the ECU 2 or the gateway 10 of the received operation. The display device 7 may be shared with, for example, a vehicle navigation system.

The server device 9 manages and stores the programs and data to be executed by the ECUs 2 installed in the vehicle 1. In response to an inquiry from the vehicle 1, the server device 9 informs the vehicle whether any program or the like needs updating. If an update is necessary, the server device 9 delivers an update program and data to the vehicle 1.

In the on-board update system 100 according to the present embodiment, the gateway 10 and the server device 9 communicate with each other while the engine of the vehicle 1 is running. The gateway 10 acquires (downloads) a program and/or data, etc. required for an update, from the server device 9. When the engine of the vehicle 1 stops (when the IG switch 4 is turned off) after the gateway 10 has finished the acquisition of the program and/or data, etc. required for an update, the display device 7 notifies a user that an update process is necessary. If the user gives an approval in response to this notification, the gateway 10 performs the update process by transmitting the acquired program and/or data, etc. to the ECU 2 to be updated. The ECU 2 receives the program and/or data, etc. required for the update from the gateway 10, and performs the update process by writing the program and/or data, etc. in its own storage unit.

Figure 2:
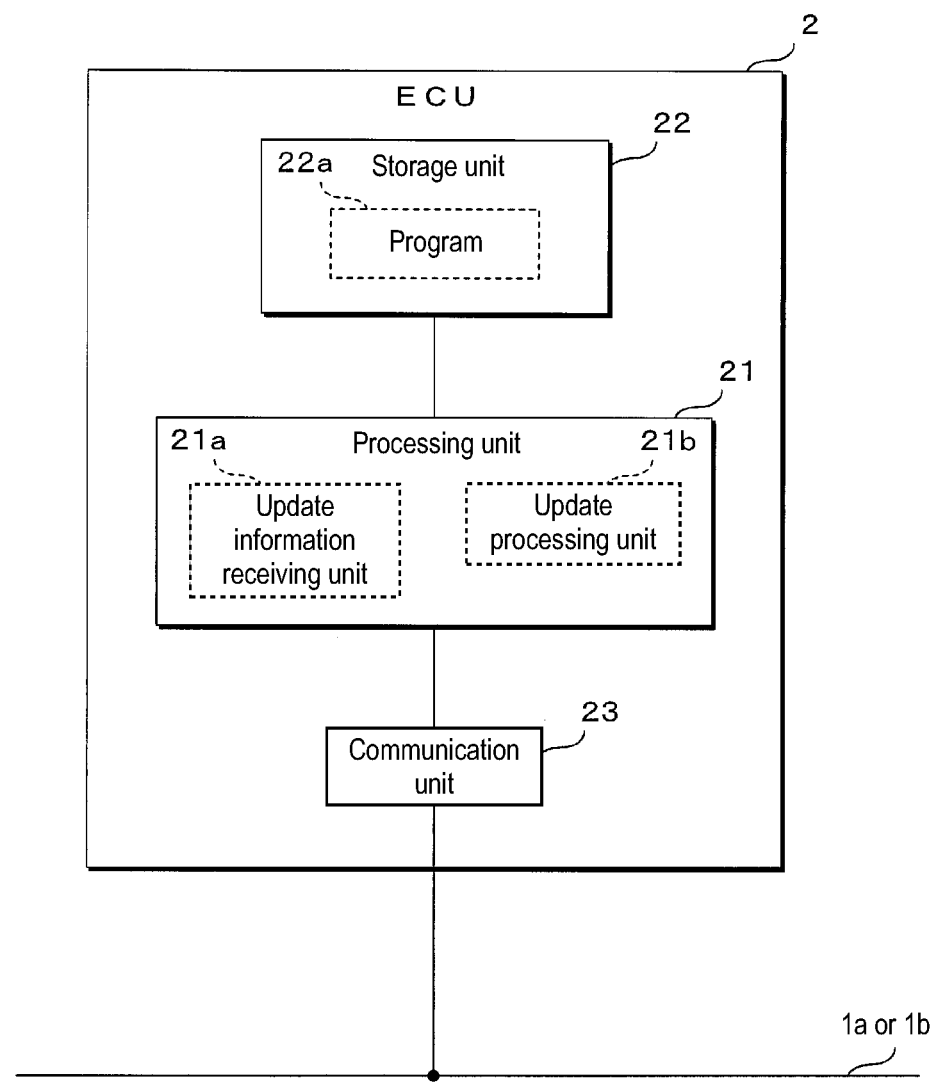
FIG. 2 is a block diagram showing the configuration of an ECU.

FIG. 2 is a block diagram showing the configuration of the ECU 2. This diagram focuses on the functional blocks common to the plurality of ECUs 2, and omits the functional blocks that are different in every ECU 2. Each of the ECUs 2 according to the present embodiment includes a processing unit 21, a storage unit 22, and a communication unit 23, for example. The processing unit 21 is constituted, for example, by an arithmetic processing unit such as a CPU (Central Processing Unit) or an MPU (Micro-Processing Unit). The processing unit 21 performs various arithmetic operations by retrieving and running a program 22a stored in the storage unit 22. The program 22a stored in the storage unit 22 is different in every ECU 2.

The storage unit 22 is configured with use of a non-volatile memory device such as a flash memory or EEPROM (Electrically Erasable Programmable Read Only Memory). The storage unit 22 stores not only the program 22a to be executed by the processing unit 21 but also data necessary for execution of the program 22a. Hereinafter, the term "program 22a" may encompass the program 22a and the data necessary for execution of the program 22a.

The communication unit 23 is connected with the communication line 1a or 1b that constitutes the in-vehicle network, and transmits and receives data pursuant to, for example, a communication protocol such as CAN (Controller Area Network). To transmit data, the communication unit 23 converts the data given from the processing unit 21 into an electric signal, and outputs the converted data signal to the communication line 1a or 1b. To receive data, the communication unit 23 samples an electrical potential at the communication line 1a or 1b, and then supplies the thus received data to the processing unit 21.

The processing unit 21 of the ECU 2 according to the present embodiment includes an update information receiving unit 21a and an update processing unit 21b. The update information receiving unit 21a and the update processing unit 21b are functional blocks for updating the program 22a stored in the storage unit 22. The update information receiving unit 21a and the update processing unit 21b are software-like functional blocks that are enabled when the processing unit 21 executes a program (illustration omitted) different from the program 22a to be updated. The update information receiving unit 21a receives an update program transmitted via the communication line 1a or 1b through the communication unit 23, and accumulates the received update program in a buffer memory or the like (illustration omitted). The update processing unit 21b updates the program 22a by storing in the storage unit 22 (overwriting on the pre-update program 22a) the update program accumulated in the buffer memory or the like.

Figure 3:
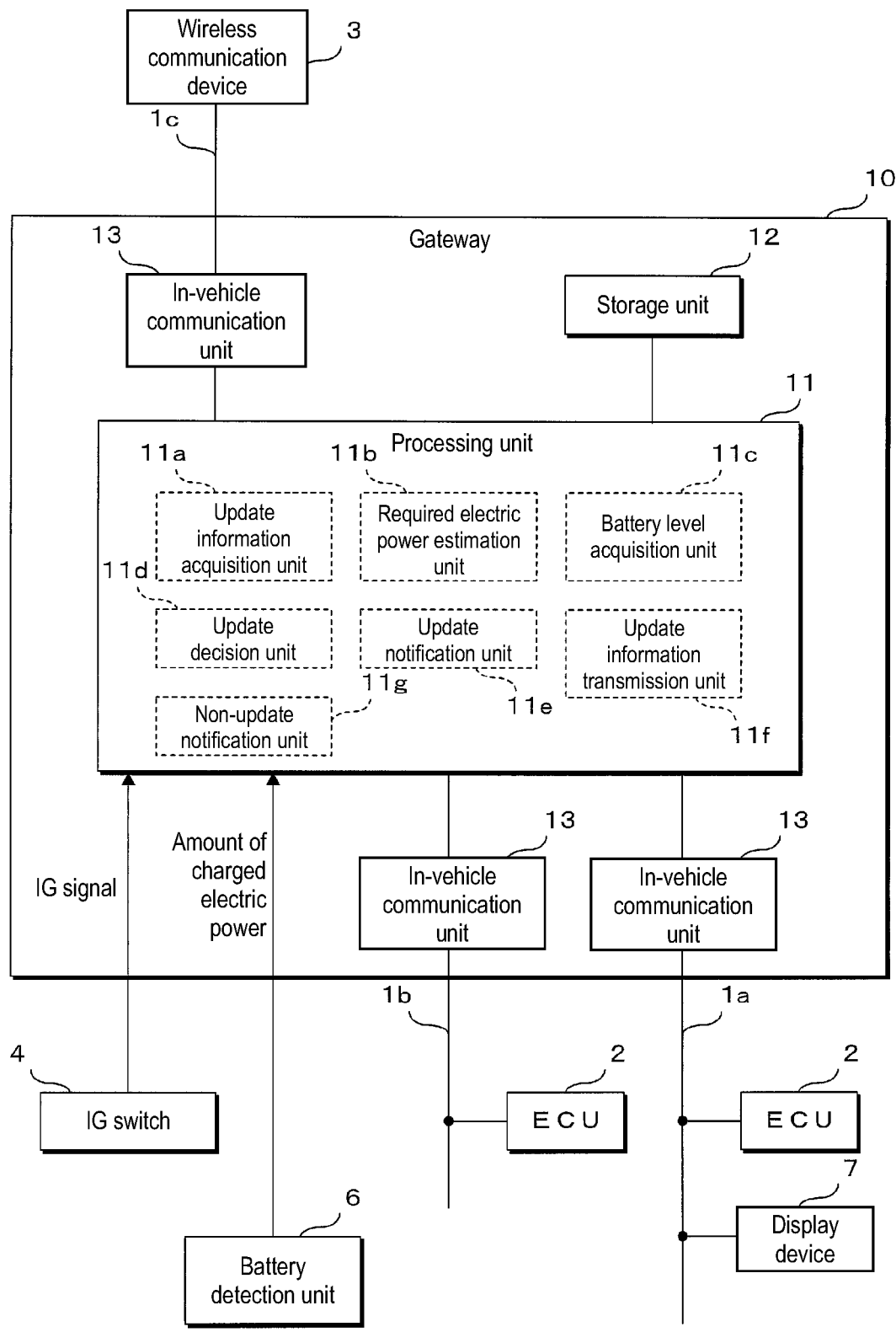
FIG. 3 is a block diagram showing the configuration of a gateway.

FIG. 3 is a block diagram showing the configuration of the gateway 10. The gateway 10 according to the present embodiment includes a processing unit (a processor) 11, a storage unit 12, three in-vehicle communication units 13, etc. The processing unit 11 is constituted, for example, by an arithmetic processing unit such as a CPU or an MPU. The processing unit 11 performs various arithmetic operations by retrieving and running a program stored in the storage unit 12, ROM (Read Only Memory) (not shown), or the like. In the present embodiment, the processing unit 11 relays the data transmitted and received on the communication lines 1a-1c that constitute the in-vehicle network, and performs arithmetic operations necessary for the update processes of the ECUs 2 or for other purposes. The processing unit 11 also receives the IG signal from the IG switch 4 in the vehicle 1 and the amount of electric power charged in the battery 5 from the battery detection unit 6. In this regard, in-vehicle communication through the communication lines 1a-1c may be also utilized to input the IG signal and/or the amount of charged electric power to the gateway 10.

The storage unit 12 is constituted by a non-volatile memory device such as a flash memory or EEPROM. The storage unit 12 stores, for example, programs and data, etc. for updating the ECUs 2. The storage unit 12 may store the programs to be executed by the processing unit 11, data necessary for execution of the programs, and the like. The storage unit 12 may also store, for example, data generated during the processing in the processing unit 11.

The in-vehicle communication units 13 are connected one by one with the communication lines 1a-1c that constitute the in-vehicle network, and transmit and receive data pursuant to, for example, a communication protocol such as CAN. To transmit information, the in-vehicle communication units 13 convert the data given from the processing unit 11 into electric signals, and output the converted data signals to the communication lines 1a-1c. To receive data, the in-vehicle communication units 13 sample electrical potentials at the communication lines 1a-1c, and then supply the thus received data to the processing unit 11. The three in-vehicle communication units 13 provided in the gateway 10 may follow different communication protocols.

The processing unit 11 executes the programs stored in the storage unit 12, ROM, or the like, and thereby enables software-like functional blocks such as an update information acquisition unit 11a, a required electric power estimation unit 11b, a battery level acquisition unit 11c, an update decision unit 11d, an update notification unit 11e, an update information transmission unit 11f, and a non-update notification unit 11g. The update information acquisition unit 11a establishes communication with the server device 9 via the wireless communication device 3 at a predetermined timing, and asks whether the programs 22a in the ECUs 2 installed in the vehicle 1 need updating. The predetermined timing for asking the necessity of updates may be a prescribed cycle (e.g., every day or every week) or, for example, every time the IG switch 4 is changed from off to on. When informed by the server device 9 that one or more updates are necessary, the update information acquisition unit 11a acquires one or more programs, data, etc. necessary for the updates (hereinafter simply called as "update program(s)") from the server device 9 via the wireless communication device 3, and stores the update programs in the storage unit 12. The update information acquisition unit 11a acquires update programs for all of the ECUs 2 that need updating.

In the present embodiment, each update program transmitted from the server device 9 to the gateway 10 includes priority level information. For example, priority level information is numerically represented by five levels ranging from 1 to 5, a greater number indicating a higher priority. As the priority level information, a proper value is determined, for example, by a manufacturer, a dealer, or a designer of the vehicle 1, and is registered in the server device 9 together with the update program. Having said that, priority level information may not be added to an update program in advance. As an alternative, the gateway 10 that has acquired an update program may determine a priority level by analyzing the content of the update program or the like.

The required electric power estimation unit 11b estimates, for each update program acquired from the server device 9, the amount of electric power consumed in an update process in the target ECU 2 using this update program. For each ECU 2, the gateway 10 stores the amount of electric power to be consumed in a process of storing the update program in the storage unit 22 of the ECU 2, as a numerical value per predetermined amount of data (e.g., 1K byte). The gateway 10 stores such values in the form of a table or the like. The required electric power estimation unit 11b checks the amount of data in an update program, and acquires the amount of consumed electric power per predetermined amount of data, for the ECU to be updated using this update program, by referring to the table. Then, the required electric power estimation unit 11b multiplies the amount of data in the update program by the amount of consumed electric power per predetermined amount of data to obtain the amount of consumed electric power in the update process using this update program. The table used in the above process is prepared in advance, based on the amount of consumed electric power calculated or measured, for example, in the design stage, the production stage, or a like stage of the vehicle 1 or the ECUs 2, and is stored, for example, in the storage unit 12 of the gateway 10.

The battery level acquisition unit 11c acquires the amount of electric power charged in the battery 5 of the vehicle 1 when the update timing of the ECUs 2 has come (in the present embodiment, when the IG switch 4 is turned off), by acquiring the amount of charged electric power from the battery detection unit 6. If the battery detection unit 6 is configured to input the amount of electric power charged in the battery 5 to the gateway 10, the battery level acquisition unit 11c only needs to acquire the detection result from the battery detection unit 6. On the other hand, if the battery detection unit 6 is merely configured, for example, to input the terminal voltage value of the battery 5, the battery level acquisition unit 11c needs to acquire input information from the battery detection unit 6 and to calculate the amount of electric power charged in the battery 5 based on the acquired information.

Based on the amount of electric power required for the update process estimated by the required electric power estimation unit 11b, and also based on the amount of electric power charged in the battery 5 acquired by the battery level acquisition unit 11c, the update decision unit 11d decides whether one or more update processes using one or more corresponding update programs acquired from the server device 9 are executable. The update decision unit 11d calculates the amount of electric power available for update processes, based on the amount of charged electric power acquired by the battery level acquisition unit 11c. For example, suppose that the amount of electric power charged in the battery 5 should not be lower than 90% and that the amount of charged electric power is currently 98%, then the update decision unit 11d calculates 98%−90%=8% as the amount of electric power available for update processes.

If more than one ECU 2 needs updating and if more than one update program is acquired from the server device 9, the required electric power estimation unit 11b calculates the amount of electric power required for each update program. The update decision unit 11d decides, separately for each update program, whether to perform an update process using a corresponding update program, in consideration of the amount of electric power available for update processes, the amount of electric power required for this update program, and the priority level of this update program.

First, the update decision unit 11d focuses on the update program of the highest priority. If the amount of electric power available for update processes is greater than the amount of required electric power, the update decision unit 11d decides to perform an update process using this highest-priority update program. Then, the amount of electric power to be consumed in the update process using the highest-priority update program is subtracted from the amount of available electric power. Thereafter, the update decision unit 11d focuses on the update program of the next highest priority, and similarly decides whether to perform an update process. In this manner, the update decision unit 11d decides whether to perform update processes, in order of priority, for all update programs acquired from the server device 9.

If the amount of electric power available for update processes is less than the amount of required electric power, the update decision unit 11d decides to suspend an update process using this update program. In this embodiment, the update decision unit 11d also decides to suspend an update process using any update program whose priority level is lower than that of the update program to be suspended, without making a decision based on the amounts of electric power. In the case where more than one update program has the same priority level and where the update decision unit 11*d* has decided to suspend an update process using one of these update programs, the update decision unit 11*d* makes a decision based on the amounts of electric power for any other update program of the same priority.

The update notification unit 11*e* displays, on the display device 7, information about an update program to be executed by the decision of the update decision unit 11*d*, and thereby notifies the user that an update process is going to be performed. If the update decision unit 11*d* has decided to suspend an update process using a certain update program, the update notification unit 11*e* does not notify the user of information about the suspended update program. Hence, the user can simply get information about the update program for an actually executable update process, and does not get information about any update program for a required but currently suspended update process. At the same time, the update notification unit 11*e* receives the user's approval to the update process at the operation unit in the display device 7. If the user does not give an approval, the gateway 10 suspends the update process.

The update information transmission unit 11*f* retrieves the update program that has been acquired by the update information acquisition unit 11*a* from the server device 9 and stored in the storage unit 22. The update information transmission unit 11*f* transmits the retrieved update program to the corresponding ECU 2 to be updated, thereby updating the program 22*a* stored in the storage unit 22 in the ECU 2. If more than one update program is decided to be executable, the update information transmission unit 11*f* transmits the update programs to the corresponding ECUs 2 in order of priority. Each ECU 2 that has received the update program from the gateway 10 updates the program 22*a* by overwriting the pre-update program 22*a* stored in the storage unit 22 with the received update program.

Each update program transmitted to the corresponding ECU 2 by the update information transmission unit 11*f* is deleted from the storage unit 12 (or may be kept, instead of being deleted, until other data need to be written). On the other hand, each update program to be suspended by the decision of the update decision unit 11*d* is kept in the storage unit 12 and waits for the next chance of an update process. For example, when the IG switch 4 is turned on to run the vehicle 1 and is turned off later, the update decision unit 11*d* decides in the above-described procedure whether to perform an update process using the update program stored in the storage unit 22, and enables the update process.

However, while the storage unit 12 keeps at least one update program for a suspended update process, it is sometimes necessary to acquire a new update program from the server device 9. In this case, if the storage unit 12 has sufficient free space, the update information acquisition unit 11*a* acquires a new update program from the server device 9 and stores the new update program in the free space on the storage unit 12. On the other hand, if the storage unit 12 does not have sufficient free space and cannot store a new update program, the update information acquisition unit 11*a* compares the priority level of each update program stored in the storage unit 12 with the priority level of the update program to be acquired from the server device 9. If any update program stored in the storage unit 12 has a lower priority level, the update information acquisition unit 11*a* deletes this low-priority update program from the storage unit 12, acquires the new update program from the server device 9, and stores the new update program in the storage unit 12.

If a suspended update program is deleted from the storage unit 12, the non-update notification unit 11*g* notifies the server device 9 of this deletion. The server device 9, which manages the update situation of the programs in each vehicle 1, stores information about whether update programs have been transmitted to the vehicles 1. After receiving the notification from one of the vehicles 1 that an update program is deleted and that an intended update process has not been performed, the server device 9 can notify the gateway 10 of this vehicle 1 that an update using the deleted update program is necessary, in response to a future inquiry from the gateway 10 about the necessity of an update or a like inquiry.

Figure 4:
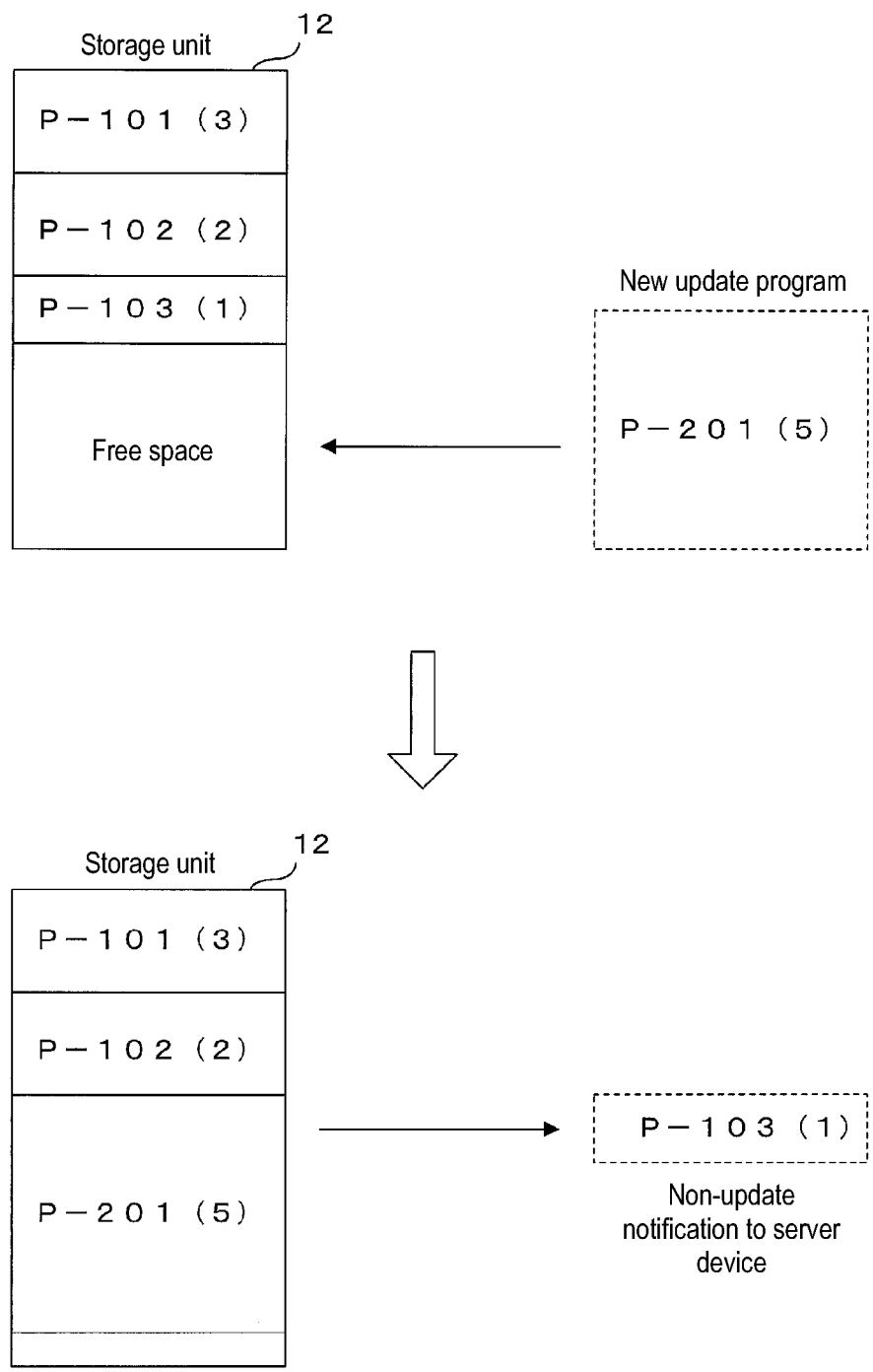
FIG. 4 is a schematic view for describing how the gateway acquires an update program.

FIG. 4 is a schematic view for describing how the gateway 10 acquires an update program. In this schematic view, update programs are shown as rectangles in solid lines or broken lines, and distinguished by codes, such as P-101 (3), given in these rectangles. Each code is composed of the initial P for program and three-digit numbers. The number in parentheses following the three-digit number indicates the priority level of the program. In this example, priority levels are represented by five levels ranging from 1 to 5, in which Priority 5 is the highest and Priority 1 is the lowest. The size of the rectangle that represents each program corresponds to the amount of data in the program.

In the example shown in the upper part of FIG. 4, the storage unit 12 in the gateway 10 stores three unused update programs P-101(3), P-102(2) and P-103(1). In this case, if the gateway 10 needs to acquire, from the server device 9, a new update program P-201(5) whose amount of data is greater than the free space on the storage unit 12, the storage unit 12 cannot store the update program P-201(5).

In this situation, the gateway 10 compares the priority levels of the update programs P-101(3), P-102(2) and P-103 (1) stored in the storage unit 12 with the priority level of the new update program P-201(5), as shown in the lower part of FIG. 4. In this example, the new update program P-201(5) has the highest priority level. Accordingly, from the storage unit 12, the gateway 10 deletes the update program P-103(1) whose priority level is lowest of the update programs P-101(3), P-102(2) and P-103(1) stored in the storage unit 12, and thereby increases free space. At this time, the gateway 10 notifies the server device 9 that the update program P-103(1) is deleted and that an intended update process is not performed. Finally, the gateway 10 acquires the new update program P-201(5) from the server device 9 and stores the new update program in the storage unit 12.

Figure 5:
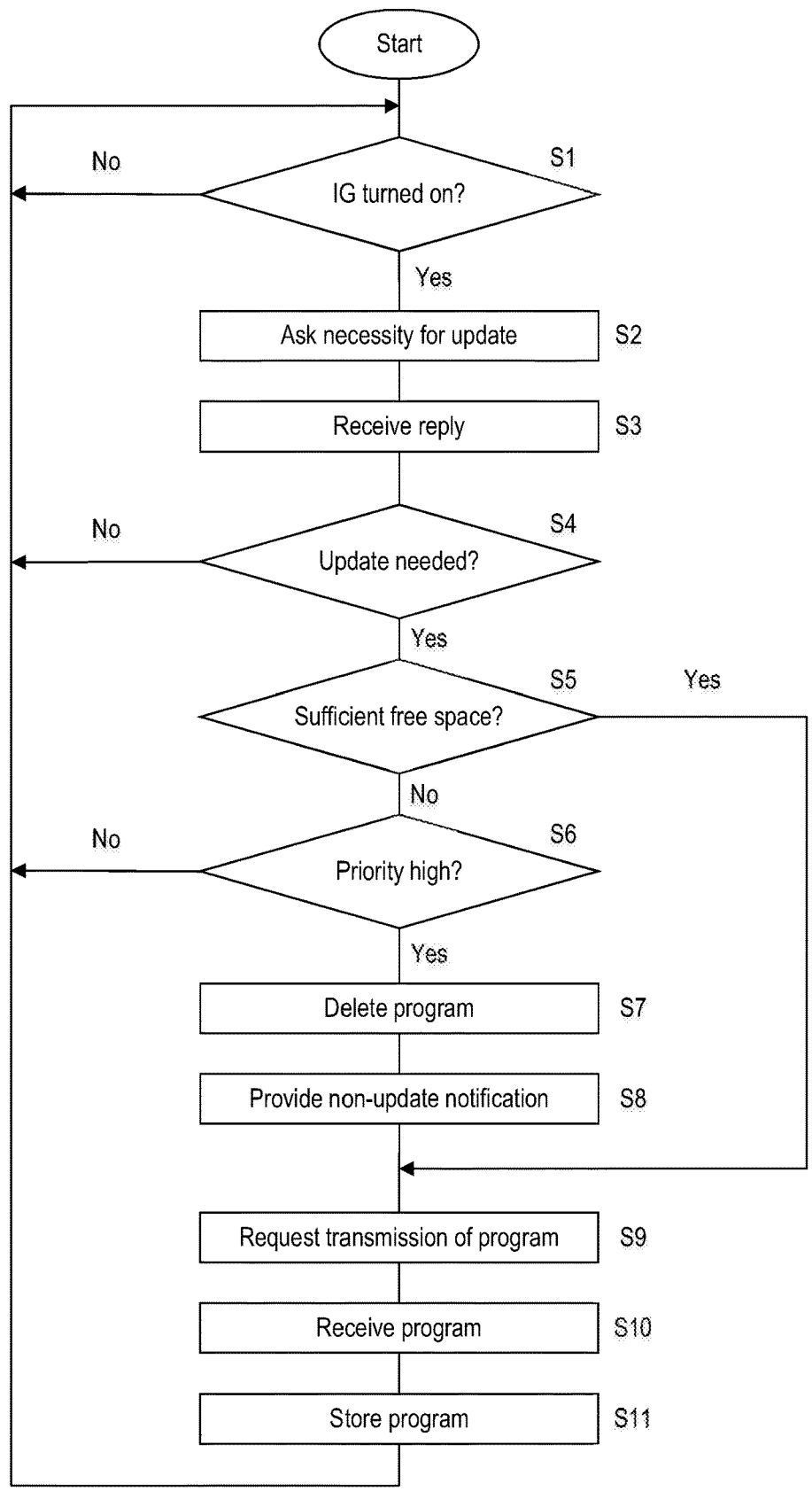
FIG. 5 is a flowchart of an update program acquisition process, showing process steps performed by the gateway.

FIG. 5 is a flowchart of an update program acquisition process, showing process steps performed by the gateway 10. In the gateway 10, the update information acquisition unit 11*a* of the processing unit 11 decides whether the IG switch 4 is turned from off to on, based on an IG signal supplied from the IG switch 4 (Step S1). If the IG switch 4 is not turned on (NO in Step S1), the update information acquisition unit 11*a* waits until the IG switch 4 is turned on. If the IG switch 4 is turned on (YES in Step S1), the update information acquisition unit 11*a* establishes wireless communication with the server device 9 via the wireless communication device 3, and asks whether any of the on-board ECUs 2 in the vehicle 1 needs to update a program (Step S2).

When the server device 9 transmits a reply to this inquiry, the update information acquisition unit 11*a* receives the reply via the wireless communication device 3 (Step S3). This reply contains not only information about the necessity of an update, but also information about a program that needs to be updated (e.g., program identification information, and other information about the program such as amount of data and priority level). Based on the information contained in the reply from the server device 9, the update information acquisition unit 11*a* decides whether any of the on-board ECUs 2 in the vehicle 1 needs to update a program (Step S4). If an update is not necessary (NO in Step S4), the process of the update information acquisition unit 11*a* returns to Step S1. If an update is necessary (YES in Step S4), the update information acquisition unit 11*a* compares the amount of data in the update program to be acquired from the server device 9 with free space on the storage unit 12, and decides whether the storage unit 12 has sufficient free space to store the new update program (Step S5).

If the storage unit 12 does not have sufficient free space (NO in Step S5), the update information acquisition unit 11*a* decides whether the priority level of the update program to be acquired from the server device 9 is higher than the priority level of each update program stored in the storage unit 12 (Step S6). If the priority level of the update program to be acquired from the server device 9 is not higher (NO in Step S6), the process of the update information acquisition unit 11*a* returns to Step S1. If the priority level of the update program to be acquired from the server device 9 is higher (YES in Step S6), the update information acquisition unit 11*a* deletes a low-priority update program stored in the storage unit 12 (Step S7). In addition, the update information acquisition unit 11*a* transmits a non-update notification of the deleted update program to the server device 9 (Step S8), and goes to Step S9.

If the storage unit 12 has sufficient free space on Step S5 (YES in Step S5) or after a non-update notification is transmitted in Step S8, the update information acquisition unit 11*a* requests the server device 9 to transmit the update program (Step S9). When the server device 9 transmits the update program in response to this request, the update information acquisition unit 11*a* receives the update program via the wireless communication device 3 (Step S10). The update information acquisition unit 11*a* stores the received update program in the free space on the storage unit 12 (Step S11). Then, the process of the update information acquisition unit 11*a* returns to Step S1.

Figure 6:
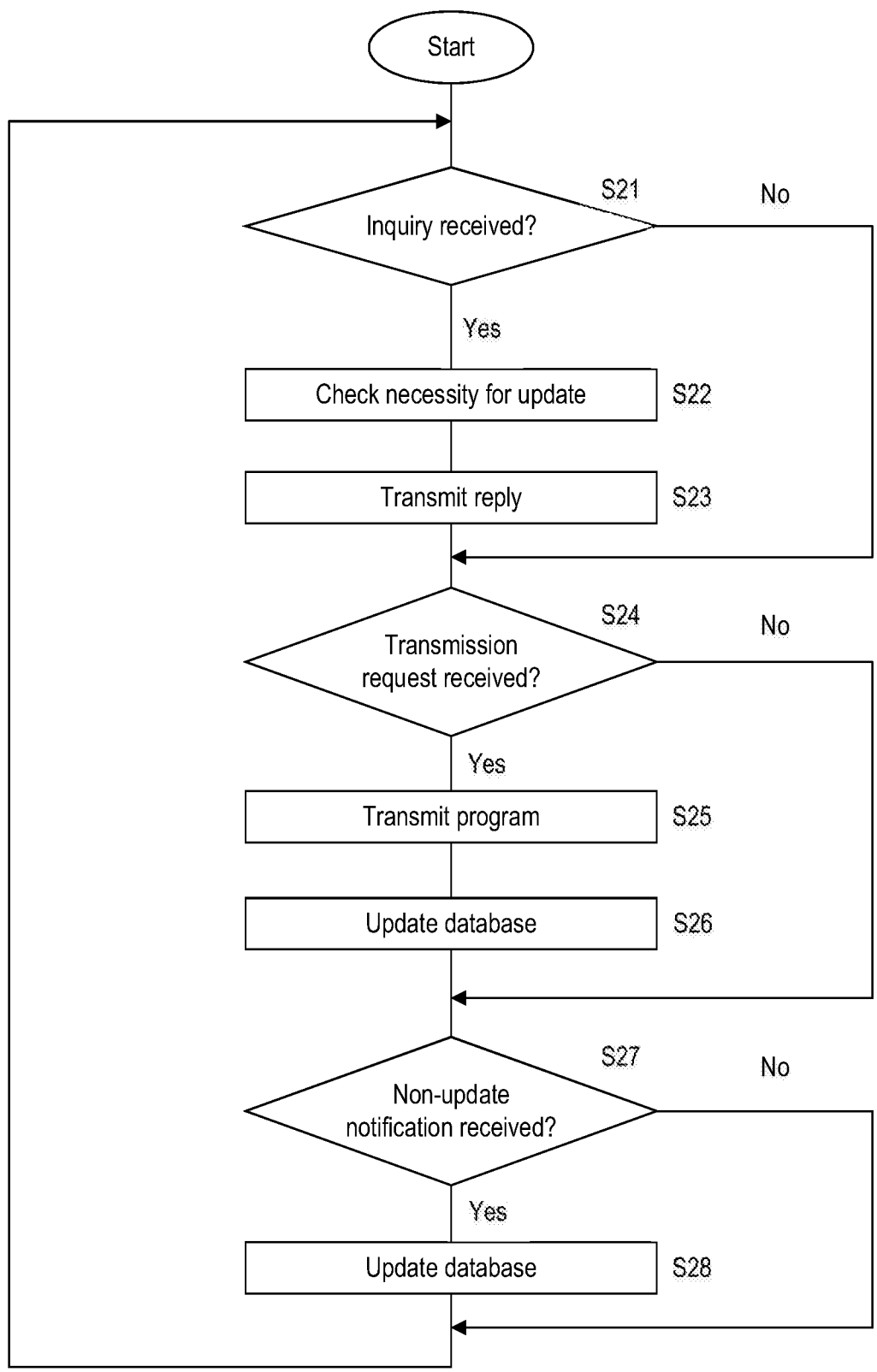
FIG. 6 is a flowchart of an update program transmission process, showing process steps performed by the server device.

FIG. 6 is a flowchart of an update program transmission process, showing process steps performed by the server device 9. The server device 9 decides whether it has received an inquiry from the gateway 10 in the vehicle 1 about the necessity of any program update in the ECUs 2 (Step S21). If no inquiry is received (NO in Step S21), the process of the server device 9 goes to Step S24. If an inquiry is received (YES in Step S21), the server device 9 accesses a database in which versions and other information about the programs for the vehicle 1 are recorded, and checks the necessity of a program update for each ECU 2 in the vehicle 1 making the inquiry (Step S22). As a reply to the originating gateway 10, the server device 9 transmits the check result of the necessity of any update (Step S23). Then, the process of the server device 9 goes to Step S24.

Next, the server device 9 decides whether it has received an update program transmission request from the gateway 10 in the vehicle 1 (Step S24). If no transmission request is received (NO in Step S24), the process of the server device 9 goes to Step S27. If a transmission request is received (YES in Step S24), the server device 9 retrieves an update program for an ECU 2 to be updated in the requestor vehicle 1, and transmits the update program to the requestor gateway 10 (Step S25). After the transmission of the update program is complete, the server device 9 updates its database to record that the update program has been transmitted (Step S26). Then, the process of the server device 9 goes to Step S27. Eventually, the updated database managed by the server device 9 holds a record that the update program has been transmitted to the requestor vehicle 1.

Thereafter, the server device 9 decides whether it has received a non-update notification from the gateway 10 in the vehicle 1 (Step S27). If a non-update notification is not received (NO in Step S27), the process of the server device 9 returns to Step S21. If a non-update notification is received (YES in Step S27), the server device 9 updates its database to change the record about the update program for which the non-update notification is issued, from "transmitted to the vehicle 1" to "not transmitted to the vehicle 1" (Step S28). Then, the process of the server device 9 returns to Step S21.

Figure 7:
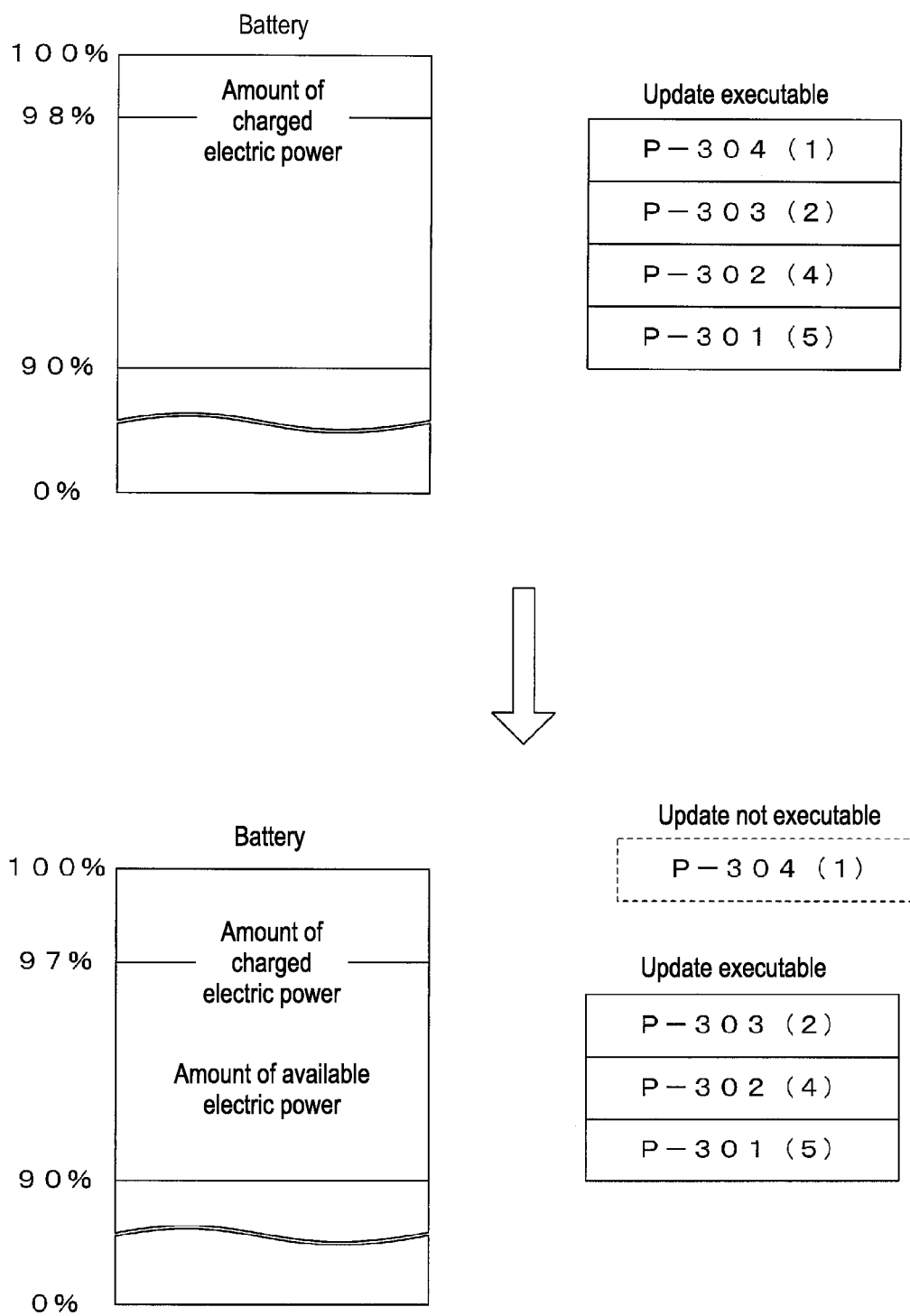
FIG. 7 is a schematic view for describing how the server device decides whether to perform any update process.
Figure 8:
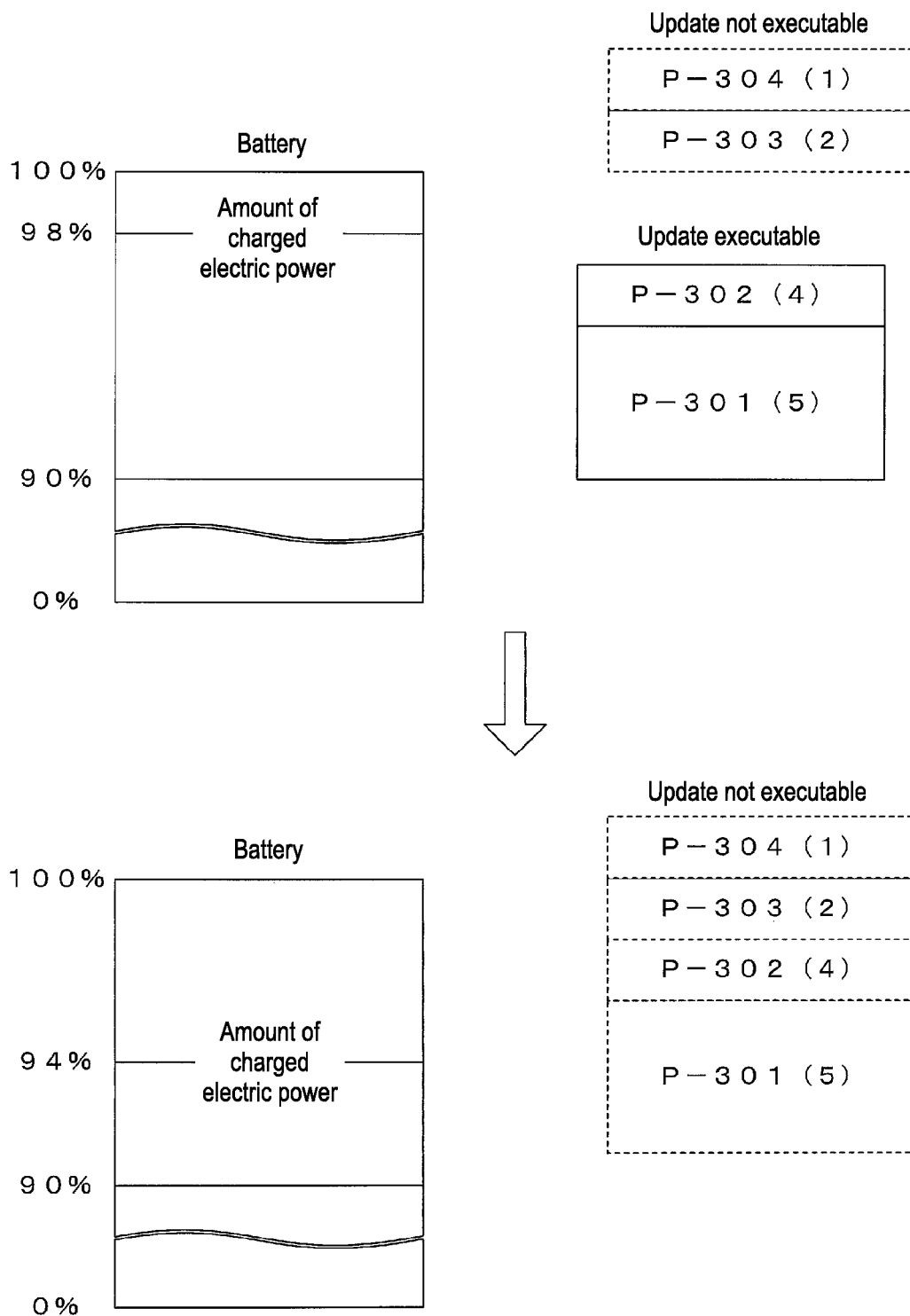
FIG. 8 is a schematic view for describing how the server device decides whether to perform any update process.
Figure 9:
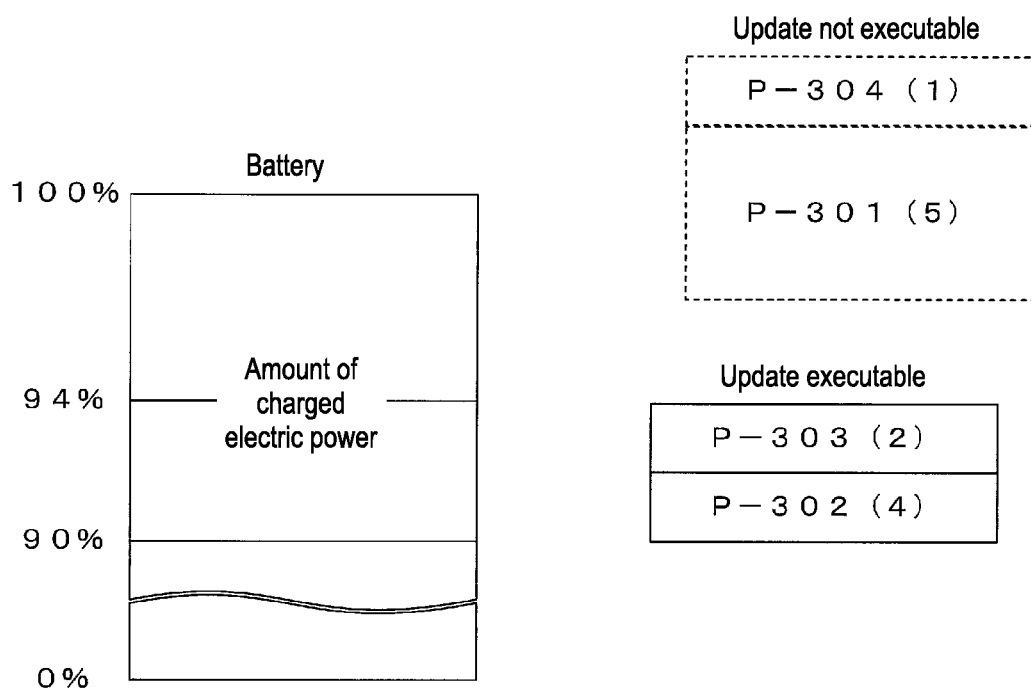
FIG. 9 is a schematic view for describing how the server device decides whether to perform any update process.

FIGS. 7 to 9 are schematic views for describing how the server device 9 decides whether to perform an update process. In these schematic views, the rectangles on the left represent the amount of electric power charged in the battery 5 and the amount of electric power available for update processes, and the rectangles on the right represent the amount of electric power required for the update processes using the update programs. The amount of electric power charged in the battery 5 is given as a percentage from 0% to 100%. For the purpose of description, suppose that these update processes may use the electric power charged in the battery 5 as long as the amount of electric power charged in the battery 5 does not get lower than 90%. The text in the rectangles on the right, such as P-301(5), follows the same rule as the text shown in FIG. 4 to identify the update programs. The size of the rectangle for each update program corresponds to the amount of electric power required for the update process.

In the example shown in the upper part of FIG. 7, the amount of electric power charged in the battery 5 is 98%, which means the amount of electric power available for update processes is 8%. Then, suppose that update processes using update programs P-301(5), P-302(4), P-303(2) and P-304(1) are necessary, and that the amount of electric power required for the update processes using these update processing programs is 2% each. In this situation, the amount of electric power required for the updates using the four update programs is 8% in total, and the amount of electric power available for update processes is 8%. Accordingly, the gateway 10 decides that the update processes using all of these update programs are executable.

In the example shown in the lower part of FIG. 7, the amount of electric power charged in the battery 5 is 97%, which is 1% less than in the example shown in the upper part of FIG. 7. In this case, not all of the update processes using these update programs are executable, and the gateway 10 preferentially selects the high-priority update programs. Namely, the gateway 10 decides that the update processes using three of the update programs P-301(5), P-302(4) and P-303(2) are executable, but that the update process using the update program P-304(1) is not executable.

In the example shown in the upper part of FIG. 8, the amount of electric power charged in the battery 5 is the same as in the example shown in the upper part of FIG. 7, but the amount of electric power required for the update process using the update program P-301(5) is 5%. In this case, the gateway 10 preferentially selects the high-priority update programs. Namely, the gateway 10 decides that the update processes using two of the update programs P-301(5) and P-302(4) are executable, but that the update processes using the other two update processing programs P-303(2) and P-304(1) are not executable.

In the example shown in the lower part of FIG. 8, the amount of electric power charged in the battery 5 is 94%, which is 4% less than in the example shown in the lower part of FIG. 8. In this case, the update process using the highest-priority update program P-301(5) is not executable. According to the present embodiment, the gateway 10 decides that not only the update process using the update program P-301(5) but also the update processes using the lower-priority update programs P-302(4), P-303(2) and P-304(1) are not executable.

In the situation shown in the lower part of FIG. 8 where the update process using the high-priority update program is not executable, the present embodiment is configured to decide that none of the update processes using the lower-priority update programs is executable. However, the present embodiment is not limited to this configuration. In the example shown in FIG. 9, the amount of electric power charged in the battery 5 and the amount of electric power required for the update programs are the same as in the example shown in the lower part of FIG. 8. In this example, the present embodiment is configured to permit one or more update processes each using a corresponding lower-priority update program, even if the update process using the high-priority update program is not executable. To make the best use of the available electric power of 4%, the gateway 10 in this modified example decides that the update processes using the update programs of the next highest priority P-302(4) and P-303(2) are executable.

Once the gateway 10 has decided one or more executable update programs in the above-described manner, the display device 7 notifies the user that one or more update processes are going to be performed using the one or more update programs. On receiving a user's approval, an update process in each ECU 2 is performed using the corresponding update program.

Figure 10:
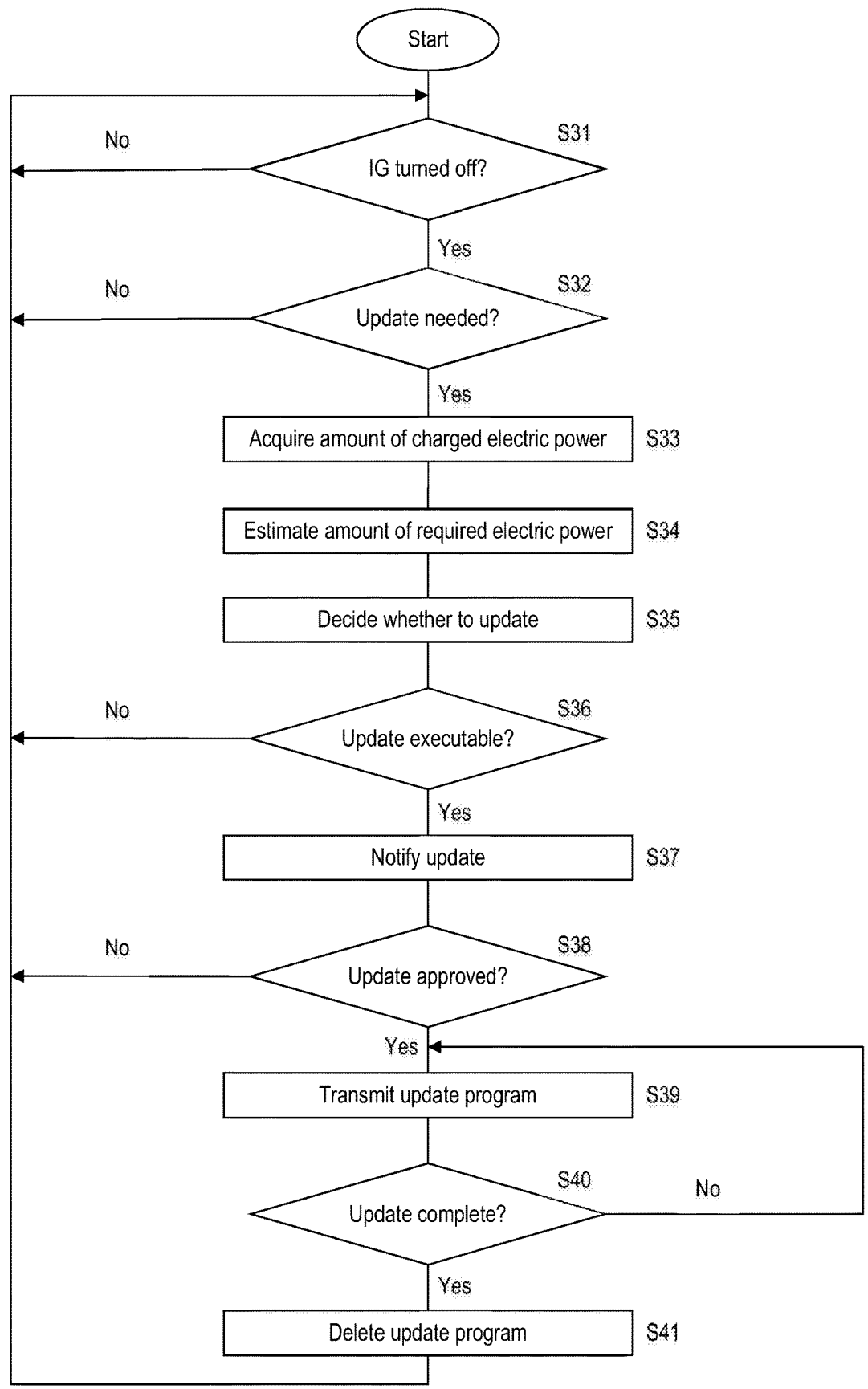
FIG. 10 is a flowchart of an update process, showing process steps performed by the gateway.

FIG. 10 is a flowchart of an update process, showing process steps performed by the gateway. In the gateway 10, the processing unit 11 decides whether the IG switch 4 is turned from on to off, based on an IG signal supplied from the IG switch 4 (Step S31). If the IG switch 4 is not turned off (NO in Step S31), the processing unit 11 waits until the IG switch 4 is turned off. If the IG switch 4 is turned off (YES in Step S31), the processing unit 11 checks whether an unused update processing program is stored in the storage unit 12, and thereby decides the necessity of an update process (Step S32). If an update process is not necessary (NO in Step S32), the process of the processing unit 11 returns to Step S31.

If an update process is necessary (YES in Step S32), the battery level acquisition unit 11c of the processing unit 11 acquires the amount of electric power charged in the battery 5, based on an input from the battery detection unit 6 (Step S33). The required electric power estimation unit 11b of the processing unit 11 estimates the amount of electric power required for an update process, for each update program stored in the storage unit 12 (Step S34). In this step, the required electric power estimation unit 11b refers to the table which contains information for each ECU 2 about the amount of consumed electric power per predetermined amount of data, and estimates the amount of required electric power, based on the amount of data in each update program.

The update decision unit 11d of the processing unit 11 calculates the amount of electric power available for update processes, from the amount of charged electric power obtained in Step S33. The update decision unit 11d then decides whether the update programs are executable in consideration of the amount of available electric power, the amounts of electric power required for the update programs, and the priority levels of the update programs (Step S35). Based on the result of the update decision process in Step S35, the processing unit 11 decides whether at least one update program is executable (Step S36). If no update program is executable (NO in Step S36), the process of the processing unit 11 returns to Step S31.

If at least one update program is executable (YES in Step S36), the update notification unit 11e of the processing unit 11 transmits a display command to the display device 7 via the in-vehicle communication unit 13, and the display device 7 provides a notification of an update process using the at least one executable update program (Step S37). A user replies to this update notification by giving an instruction at the operation unit in the display device 7. On receiving a user's instruction, the update notification unit 11e decides whether the update is approved (Step S38). If the update is not approved (NO in Step S38), the process of the processing unit 11 returns to Step S31.

If the update is approved (YES in Step S38), the update information transmission unit 11f of the processing unit 11 transmits the update program stored in the storage unit 12, via the in-vehicle communication unit 13, to the ECU 2 to be updated (Step S39). The update information transmission unit 11f decides whether all of the ECU 2 to be updated have completed their update processes, depending on whether it has received an update completion notification from each ECU 2 to be updated (Step S40). If not all of the update processes are complete (NO in Step S40), the process of the update information transmission unit 11f returns to Step S39, and the update information transmission unit 11f continues to transmit the update programs. If the update processes are complete (YES in Step S40), the processing unit 11 deletes the used update programs from the storage unit 12 after the intended update processes are complete (Step S41). Then, the process of the processing unit 11 returns to Step S31.

Figure 11:
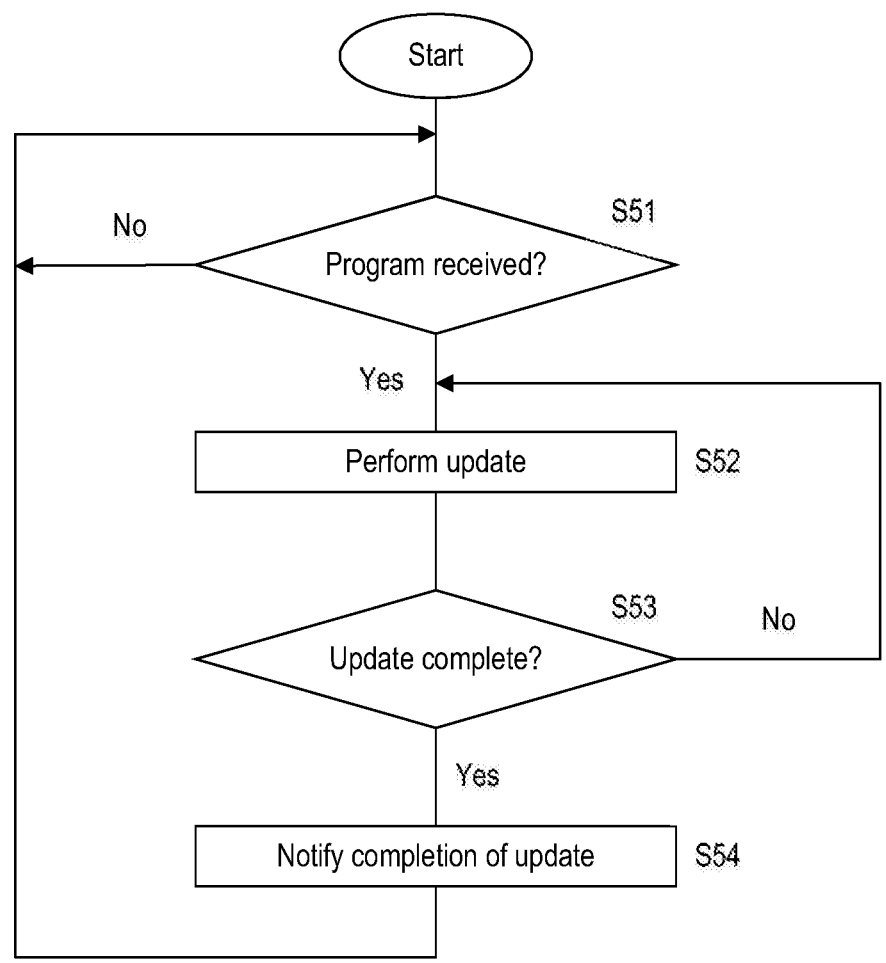
FIG. 11 is a flowchart of the update process, showing process steps performed by each ECU.

FIG. 11 is a flowchart of the update process, showing process steps performed by each ECU 2. In the ECU 2, the update information receiving unit 21a of the processing unit 21 decides whether the update program transmitted from the gateway 10 is received by the communication unit 23 (Step S51). If the update program is not received (NO in Step S51), the update information receiving unit 21a waits until the update program is received. If the update program is received (YES in Step S51), the update information receiving unit 21a temporarily stores the received update program in the buffer or the like. The update processing unit 21b of the processing unit 21 updates the program 22a by storing (overwriting) the received update program in the storage unit 22 (Step S52). The update processing unit 21b decides whether the update of the program 22a is complete (Step S53). If the update is not complete (NO in Step S53), the process returns to Step S52, and the update processing unit 21b continues the update process. If the update of the program 22a is complete (YES in Step S53), the processing unit 21 notifies the gateway 10 of completion of the update via the communication unit 23 (Step S54), and the process returns to Step S51.

In the thus configured on-board update system 100 according to this embodiment, the gateway 10 performs the update processes of the plurality of programs 22a (programs or data) in the ECUs 2 installed in the vehicle 1. The gateway 10 acquires update programs (update programs or data) from the external server device 9 by wireless communication via the wireless communication device 3. If more than one ECU 2 needs updating, the gateway 10 acquires an update program for each ECU 2. Alternatively, the on-board update system may be configured to apply one update program to the update process of more than one ECU 2.

The gateway 10 not only estimates the amount of electric power required for an update process for each of the acquired update programs, but also acquires the amount of electric power charged in the battery 5 of the vehicle 1, based on an input from the battery detection unit 6. The gateway 10 performs the update processes of the ECUs 2, in consideration of the estimated amounts of required electric power, the amount of electric power charged in the battery 5, and the priority levels of the update programs. Regarding the priority levels of the update programs, the gateway 10 may be configured to acquire priority level information, for example, from the server device 9 together with the update programs, or may be configured, for example, to add priority levels by itself to the acquired update programs.

Owing to this configuration, the gateway 10 can preferentially perform update processes using high-priority update programs, in consideration of the amount of electric power charged in the battery 5 at the moment. Besides, the gateway 10 can stop or postpone an update process if the gateway 10 has decided, based on the amount of electric power charged in the battery 5, that the update process should be suspended. Eventually, the on-board update system 100 can prevent a serious decrease in the amount of electric power charged in the battery 5 of the vehicle 1 caused by update processes in the ECUs 2.

The gateway 10 decides whether an update process using an update program acquired from the server device 9 is executable, in consideration of not only the amount of electric power charged in the battery 5 but also the amount of electric power required for the update process in the ECU 2. The gateway 10 preferentially performs an update process using a high-priority update program that is decided to be executable in consideration of the charged amount and the required amount of electric power. Eventually, even if the amount of electric power charged in the battery 5 is limited, the gateway 10 preferentially performs an update process of higher priority.

If the gateway 10 has decided that an update using a high-priority update program is not executable in consideration of the amount of electric power required for this update and the amount of electric power charged in the battery 5, the gateway 10 suspends not only the update process using this high-priority update program but also any update process using a lower-priority update program. In other words, the gateway 10 keeps any lower-priority update process on standby until completion of the update process using the high-priority update program. In the case where, for example, a high-priority update process requires a large amount of electric power, this configuration can prevent the high-priority update process from being left on standby.

Alternatively, if the gateway 10 has decided that an update using a high-priority update program is not executable in consideration of the amount of electric power required for this update and the amount of electric power charged in the battery 5, the gateway 10 decides whether to perform an update process using an update program of the next highest priority. If the update program of the next highest priority is executable, the gateway 10 performs this update process. This configuration can make the best use of the electric power charged in the battery 5 to perform as many update processes as possible.

When an update process is to be performed, the gateway 10 provides a notification of update-related information to a user of the vehicle 1 or someone else, by means of the display device 7. With this notification, a user or someone else can see the program update state in the ECUs 2 installed in the vehicle 1. On the other hand, information on an update program for an update process to be suspended in consideration of the amount of electric power required for this update and the amount of electric power charged in the battery 5 is not notified to a user or someone else, even if the gateway 10 has acquired the update program from the server device 9. With this arrangement, a user is not bothered by unnecessary information (e.g. information about a program or data for a suspended update process). The update program for a suspended update process may be informed later, when the amount of electric power charged in the battery 5 increases sufficiently to enable the suspended update process.

The gateway 10 stores every update program acquired from the server device 9 in the storage unit 12. The storage unit 12 is preferably a non-volatile storage unit. The gateway 10 deletes any used update program from the storage unit 12 after the intended update process is complete, but keeps, in the storage unit 12, any update program for an update process to be suspended in consideration of the amount of electric power required for the update and the amount of electric power charged in the battery 5. Later, when the amount of electric power charged in the battery 5 increases sufficiently to enable the suspended update process, the gateway 10 may use the update program stored in the storage unit 12 to perform the update process, without acquiring the update program from the server device 9 again.

If the gateway 10 which stores at least one update program in the storage unit 12 needs to acquire another update program from the server device 9, the gateway 10 decides whether to acquire the new update program from the server device 9, in consideration of the free space on the storage unit 12 and the priority levels of the update programs.

For example, if the gateway 10 needs to acquire another update program from the server device 9 but does not have sufficient free space on the storage unit 12, the gateway 10 compares the priority level of each update program stored in the storage unit 12 with the priority level of the update program to be newly acquired. If the priority level of any update program stored in the storage unit 12 is lower than the priority level of the new update program, the gateway 10 deletes the lower-priority update program stored in the storage unit 12, acquires the new update program from the server device 9, and stores this new update program in the storage unit 12. Thereafter, the gateway 10 notifies the server device 9 that the lower-priority update program is deleted from the storage unit 12 and that an intended update has not been performed.

As described, when the gateway 10 needs to acquire a new update program from the server device 9, the storage unit 12 may be occupied with update programs for suspended update processes and may not have sufficient free space. In this situation, the above-described arrangements enable the gateway 10 to decide whether to acquire the new update program, based on their priority levels. When the gateway 10 has acquired and stored a high-priority new update program in the storage unit 12 and has deleted a lower-priority update program from the storage unit 12, the gateway 10 notifies the server device 9 of this deletion. Such notification enables the gateway 10 to acquire the deleted update program later again.

In the above-described embodiment, the gateway 10 installed in the vehicle 1 is configured to acquire update programs from the server device 9 and to transmit the update programs to the ECUs 2. Namely, the gateway 10 is configured to serve as the on-board update device. However, the on-board update device is not limited to the gateway 10, and may be any one of the ECUs 2, the wireless communication device 3, or any other on-board device. Further, the gateway 10 is configured to acquire the update programs from the external server device 9 by wireless communication, but the update programs may be acquired in any other manner. For example, the gateway 10 may be configured to retrieve an update program from a recording medium on which the update program is recorded. Furthermore, the communication devices to be updated are not limited to the ECUs 2, but may be various communication devices other than the ECUs 2. Additionally, the communication in the vehicle 1 between the gateway 10 and the ECUs 2 or the like is not limited to wired communication and may be wireless communication.

In the present embodiment, the gateway 10 is configured to perform the update process when the IG switch 4 is turned off, but the timing of the update process is not limited thereto. For example, the gateway 10 may perform an update process if the IG switch 4 is off at a predetermined time (e.g., 2:00 a.m.). Thus, the timing of the update process may not necessarily be immediately after the IG switch 4 is turned off. In this case, the gateway 10 can be arranged not to send notification to a user. Alternatively, the gateway 10 can be arranged to notify a user of an update using an acquired update program when the IG switch 4 is turned off, irrespective of the amount of electric power charged in the battery 5, so as to obtain user's advance approval to the update. Later, when the timing of the update process comes, the gateway 10 may check the amount of electric power charged in the battery 5 and may decide whether to perform the update process.

Embodiment 2

Figure 12:
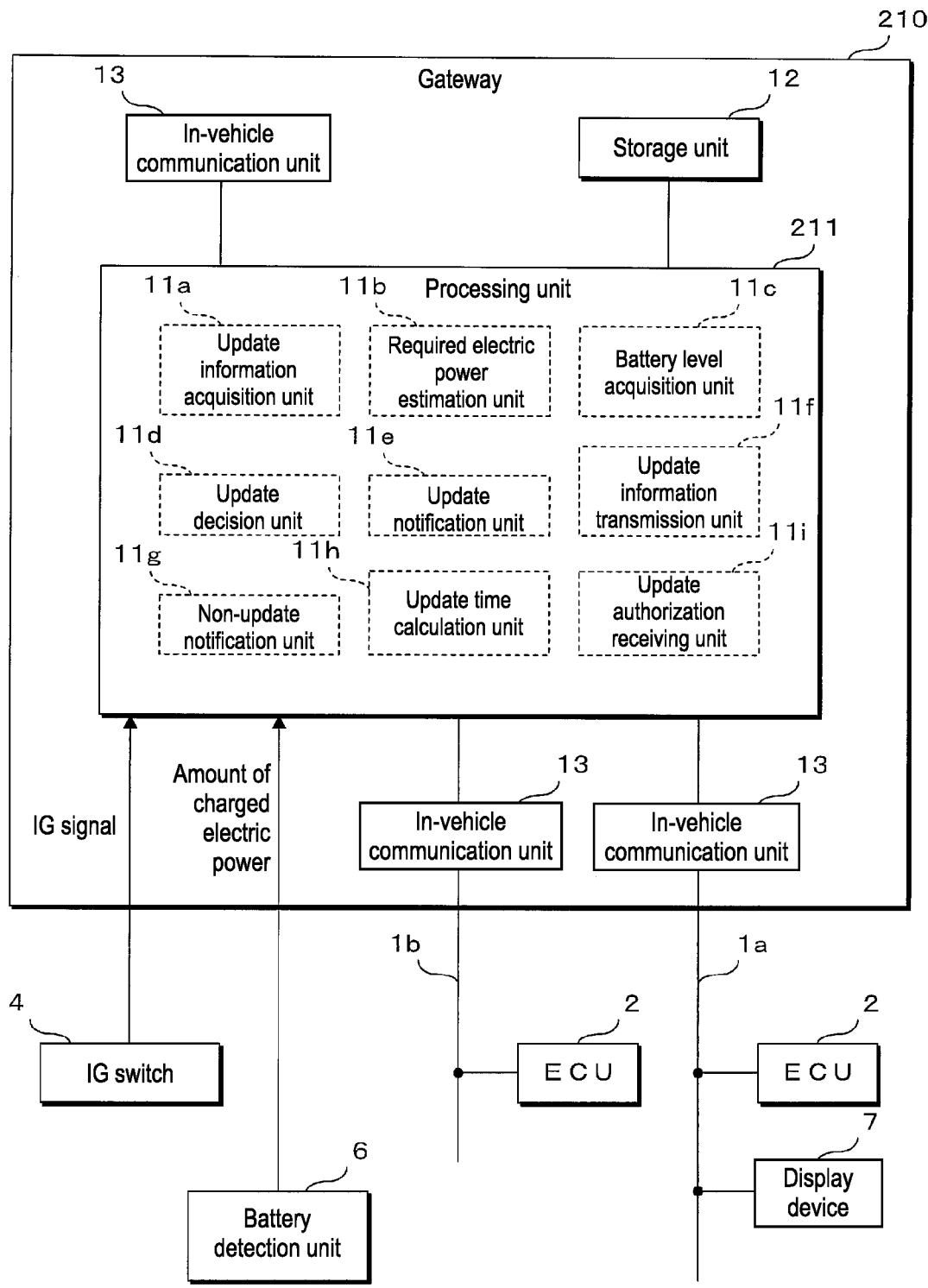
FIG. 12 is a block diagram showing the configuration of a gateway according to Embodiment 2.

FIG. 12 is a block diagram showing the configuration of a gateway according to Embodiment 2. A gateway 210 according to Embodiment 2 is based on the gateway 10 according to Embodiment 1, and is further provided with an update time calculation unit 11h and an update authorization receiving unit 11i in a processing unit 211. Similar to the update information acquisition unit 11a to the non-update notification unit 11g, the update time calculation unit 11h and the update authorization receiving unit 11i are functional blocks that are enabled when the processing unit 211 executes a program stored in the storage unit 12, ROM, or the like.

The update time calculation unit 11h calculates (estimates), for each update program acquired from the server device 9, the time required to perform an update process in the ECU 2 using the update program. The update time calculation unit 11h can calculate the time required for each update process, for example, based on the volume of update program, the processing speed of the ECU 2 to be updated with the update program, and the like. The processing speed of the ECU 2 as mentioned herein is not necessarily the processing speed of the processing unit 21 in the ECU 2, but may be a speed dependent on the writing speed in the storage unit 22. For such calculation, the gateway 210 stores, in advance, information about the processing speed of each ECU 2 to which an update may applied.

In the gateway 210 according to Embodiment 2, the update notification unit 11e displays, on the display device 7, information about update programs to be executed by the decision of the update decision unit 11d, as well as their update times calculated by the update time calculation unit 11h.

After the update notification unit 11e has provided notification to a user, the update authorization receiving unit 11i receives user's selective authorization of at least one update process using an update program. In the present embodiment, the update authorization receiving unit 11i communicates with the display device 7 via the in-vehicle communication unit 13, and receives user's selection at the operation unit in the display device 7.

FIG. 13 is a schematic view that represents an example of an update information notification screen shown on the display device 7 in the on-board update system 100 according to Embodiment 2. The update notification unit 11e in the gateway 210 displays "Program update information" on the display device 7. The "Program update information" includes information about any update program that has been decided to be executable in consideration of the amount of electric power in the battery 5. The program update information notification screen shows update program names, required update times, checkboxes 71 for authorization of the updates, an update start button 72, a cancel button 73, and the like.

The update program names to be shown on the program update information notification screen are preferably names by which a user of the vehicle 1 can easily identify their program contents (e.g., vehicle navigation update program, security update program for wireless communication, recall solution program, etc.), rather than file names of the update programs or the like. The program names to be shown are provided as accompanying information, for example, when the gateway 210 acquires update programs from the server device 9. In the illustrated example, update program names are as simple as Programs A to E.

The required update times to be shown on the program update information notification screen are calculated for the update programs by the update time calculation unit 11h. In the illustrated example, the update times are 50 seconds for Program A, three minutes for Program B, one minute for Program C, 30 seconds for Program D, and two minutes for Program E.

In the present embodiment, the display device 7 includes a touchscreen configured to detect a touch operation on the display screen. The touchscreen can detect touch operations at the checkboxes 71, the update start button 72, and the cancel button 73 provided on the program update information notification screen.

On the program update information notification screen, a checkbox 71 is provided for each program. The checkbox 71 toggles between the checked state and the unchecked state in response to user's touch operation. A user can authorize or unauthorize an update process by changing the state of the checkbox 71. In the illustrated example, update processes using Programs B and C are authorized, and update processes using Programs A, D and E are not authorized.

The update start button 72 provided on the program update information notification screen receives an instruction to start the update processes by user's touch operation. A touch operation on the update start button 72 starts the update processes using the programs authorized at the checkbox 71. If no update program is authorized at the checkboxes 71 (if all checkboxes 71 are unchecked), an error message or the like appears.

The cancel button 73 provided on the program update information notification screen receives an instruction to stop the update processes by user's touch operation. A touch operation on the cancel button 73 suspends all update processes using the displayed programs, irrespective of whether the checkboxes 71 are checked or unchecked.

After displaying the program update information notification screen, the display device 7 receives touch operations at the checkboxes 71, the update start button 72, and the cancel button 73, and notifies the received operations to the gateway 210. Based on the operations notified by the display device 7, the update authorization receiving unit 11$i$ in the gateway 210 receives selective authorization of the update processes.

Figure 14:
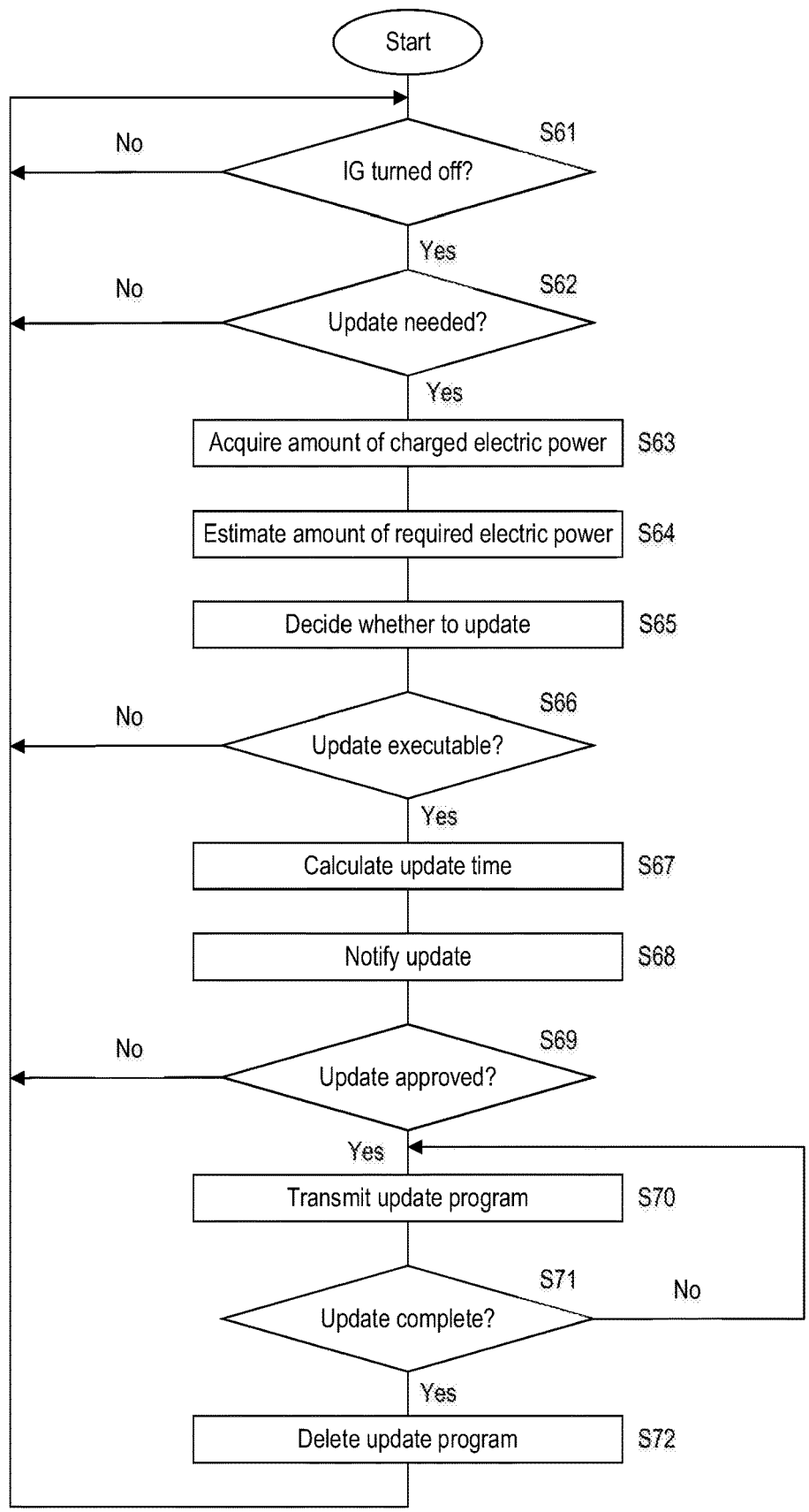
FIG. 14 is a flowchart of the update process, showing process steps performed by the gateway according to Embodiment 2.

FIG. 14 is a flowchart of the update process, showing process steps performed by the gateway 210 according to Embodiment 2. In the gateway 210 according to Embodiment 2, the processing unit 211 decides whether the IG switch 4 is turned from on to off (Step S61). If the IG switch 4 is not turned off (NO in Step S61), the processing unit 211 waits until the IG switch 4 is turned off. If the IG switch 4 is turned off (YES in Step S61), the processing unit 211 decides the necessity of an update process (Step S62). If an update process is not necessary (NO in Step S62), the process of the processing unit 211 returns to Step S61.

If an update process is necessary (YES in Step S62), the battery level acquisition unit 11$c$ of the processing unit 211 acquires the amount of electric power charged in the battery 5 (Step S63). The required electric power estimation unit 11$b$ of the processing unit 211 estimates the amount of electric power required for an update process, for each update program stored in the storage unit 12 (Step S64).

The update decision unit 11$d$ of the processing unit 211 calculates the amount of electric power available for update processes, from the amount of charged electric power obtained in Step S63. The update decision unit 11$d$ then decides whether the update programs are executable in consideration of the amount of available electric power, the amounts of electric power required for the update programs, and the priority levels of the update programs (Step S65). Based on the result of the update decision process in Step S65, the processing unit 211 decides whether at least one update program is executable (Step S66). If no update program is executable (NO in Step S66), the process of the processing unit 211 returns to Step S61.

If at least one update program is executable (YES in Step S66), the update time calculation unit 11$h$ of the processing unit 211 calculates the time required to perform an update process using each executable update program (Step S67). Next, the update notification unit 11$e$ of the processing unit 211 transmits, to the display device 7, a command to display the program update information notification screen shown in FIG. 13, including each update time calculated in Step S67. On receiving this command, the display device 7 provides information about the at least one update process to a user (Step S68).

The update authorization receiving unit 11$i$ of the processing unit 211 decides whether any update process using at least one update program is authorized, based on user's operation received at the operation unit in the display device 7 (Step S69). If no update using any update program is authorized (NO in Step S69), the process of the processing unit 211 returns to Step S61.

If any update process using at least one update program is authorized (YES in Step S69), the update information transmission unit 11$f$ of the processing unit 211 transmits the update program stored in the storage unit 12, via the in-vehicle communication unit 13, to the ECU 2 to be updated (Step S70). The update information transmission unit 11$f$ decides whether all of the ECU 2 to be updated have completed their update processes, depending on whether it has received an update completion notification from each ECU 2 to be updated (Step S71). If not all of the update processes are complete (NO in Step S71), the process of the update information transmission unit 11$f$ returns to Step S70, and the update information transmission unit 11$f$ continues to transmit the update programs. If all of the update processes are complete (YES in Step S71), the processing unit 211 deletes the used update programs from the storage unit 12 after the intended update processes are complete (Step S72). Then, the process of the processing unit 211 returns to Step S61.

In the on-board update system 100 according to Embodiment 2 configured as above, the gateway 210 shows the notification screen on the display device 7 to provide notification of one or more update processes, and thereafter receives user's selective authorization of at least one update process using an update program. If any update process is authorized, the gateway 210 performs the update process. If no update process is authorized, the gateway 210 suspends every update process. For example, if a user intends to use the vehicle 1 just when or shortly after the user receives an update process, the user can select suspension of the update process and can use the vehicle 1 without being disturbed by the update process.

If the gateway 210 has decided that more than one update program is executable in consideration of the charged amount of the battery 5, the gateway 210 receives authorization of an update process one by one for every update program. This configuration can extend the range of user's selection in performing one or more update processes.

Further, the gateway 210 calculates the time required to perform an update process in each ECU 2 using an update program, and notifies the user of the calculated update time on the notification screen. The required update time can be calculated, for example, from information about the volume of update program, information about the processing speed of the ECU 2 to be updated, and the like. Such notification allows a user to know, for example, the finish time of the update process, and to anticipate how long the vehicle 1 is unavailable due to the update process.

If the gateway 210 has decided that more than one update program is executable in consideration of the charged amount of the battery 5, the gateway 210 calculates and provides a notification of the update time one by one for every update program. Such notification can provide a user with more specific information about the required update time for each update process.

As described above, the gateway 210 is configured to provide notification of the required update time for each update process. Eventually, to receive authorization of each update process on the notification screen, the gateway 210 can provide a user with helpful information for deciding whether to authorize an update process.

Regarding Embodiment 2, the notification screen shown in FIG. 13 is a mere example and not limited thereto. The update times of the programs shown on the notification screen are mere examples and not limited thereto. Authorization of updates is received by means of the checkboxes 71 on the notification screen, but the manner for receiving authorization is not limited thereto and may be any other manner than using the checkboxes 71.

Modified Example 1

In the on-board update system 100 according to Embodiment 2, the update time is calculated for every update process in the gateway 210. However, the update time may be obtained in any other manner. In the on-board update system 100 according to Modified Example 1, the gateway 210, which acquires an update program from the server device 9, also acquires information about the required update time using this update program from the server device 9.

In the on-board update system 100 according to Modified Example 1, the server device 9 stores not only the update programs to be transmitted to the gateway 210 in the vehicle 1 but also information about the required update times using these update programs. The required update times are calculated, measured or obtained otherwise in advance, for example, by developers of the ECUs or the update programs, and stored in the server device 9 together with the update programs.

Instead, every time the server device 9 transmits an update program to the gateway 210, the server device 9 may calculate the required update time using this update program. The server device 9 can calculate the update time, based on the volume of update program and the processing speed of the ECU 2 to be updated with this update program. For such calculation, the server device 9 has a database or the like that stores the processing speed of each ECU 2 to which an update processing program may be applied.

Modified Example 2

Regarding the on-board update system 100 according to Embodiment 2, the notification screen to be displayed by the gateway 210, as exemplified in FIG. 13, provides information about the update program names and the required update times. However, information to be provided to a user on the notification screen is not limited thereto. The gateway 210 according to Modified Example 2 provides, for each program, not only information about the update program name and the required update time but also information about the amount of electric power estimated by the required electric power estimation unit 11b. The amount of electric power may be presented, for example, as the proportion of the amount of consumed electric power to the full or remaining capacity of the battery 5, or as the amount of electric power in W (watt) or a like unit.

The gateway 210 according to Modified Example 2 may notify a user of the update priority levels of the programs. For example, the gateway 210 may present the priority levels numerically on the notification screen, or may list a plurality of programs, for example, in order of priority.

The other configurations in the on-board update system 100 according to Embodiment 2 are similar to those in the on-board update system 100 according to Embodiment 1. Hence, like components are given like reference numerals to omit their detailed description.

The invention claimed is:

1. An on-board update device comprising:
   an update processing unit configured to update a program or data stored in a storage unit of a communication device installed in a vehicle,
   an update information acquisition unit configured to acquire an update program or data from a device outside the vehicle, wherein the update information acquisition unit includes an update storage unit configured to store the update program or data, the update storage unit is configured to delete an update program or data after an intended update process is complete, and to keep an update program or data acquired by the update information acquisition unit but not used for an intended update process by the update processing unit;
   a required electric power estimation unit configured to estimate an amount of electric power required for an update process using the update program or data acquired by the update information acquisition unit;
   a battery level acquisition unit configured to acquire an amount of electric power charged in a battery of the vehicle;
   wherein the update processing unit is configured to perform an update process in consideration of the amount of electric power estimated by the required electric power estimation unit, the amount of electric power acquired by the battery level acquisition unit, and a priority level of the update program or data acquired by the update information acquisition unit; and
   wherein, if an update program or data is kept in the update storage unit, the update information acquisition unit is configured to decide whether to acquire a next update program or data from the device outside the vehicle, in consideration of a priority level of the update program or data kept in the update storage unit and free space on the update storage unit.

2. The on-board update device according to claim 1,
   further comprising an update decision unit configured to decide whether the update process using the update program or data acquired by the update information acquisition unit is executable, in consideration of the amount of electric power acquired by the battery level acquisition unit and the amount of electric power estimated by the required electric power estimation unit,
   wherein the update processing unit is configured to preferentially perform an update process using a high-priority update program or data, if the update decision unit decides that the update process using the high-priority update program or data is executable.

3. The on-board update device according to claim 2,
   wherein, if the update decision unit decides that the update process using the high-priority update program or data is not executable, the update processing unit is configured to suspend the update process using the high-priority update program or data, and also to suspend an update process using any update program or data having a lower priority than the high-priority update program or data.

4. The on-board update device according to claim 2,
   wherein, if the update decision unit decides that the update process using the high-priority update program or data is not executable, the update processing unit is configured to suspend the update process using the high-priority update program or data, and to perform an update process using an update program or data of a next highest priority, in accordance with a decision result by the update decision unit.

5. The on-board update device according to claim 1,
   wherein, if the update storage unit has insufficient free space and also if the priority level of the update program or data kept in the update storage unit is lower than a priority level of the next update program or data, the update information acquisition unit is configured to delete the update program or data kept in the update storage unit, to acquire the next update program or data from the device outside the vehicle, and to store the next update program or data in the update storage unit.

6. The on-board update device according to claim 5,
   further comprising a non-update notification unit,
   wherein, if the update program or data not used for an intended update process is deleted from the update storage unit, the non-update notification unit is configured to notify the device outside the vehicle of this deletion.

7. An on-board update system which comprises:

a plurality of communication devices installed in a vehicle, and an on-board update device comprising:

an update processing unit configured to update a program or data stored in a storage unit of each communication device, wherein the update information acquisition unit includes an update storage unit configured to store the update program or data, the update storage unit is configured to delete an update program or data after an intended update process is complete, and to keep an update program or data acquired by the update information acquisition unit but not used for an intended update process by the update processing unit, an update information acquisition unit configured to acquire an update program or data from a device outside the vehicle;

a required electric power estimation unit configured to estimate an amount of electric power required for an update process using the update program or data acquired by the update information acquisition unit; and a battery level acquisition unit configured to acquire an amount of electric power charged in a battery of the vehicle, wherein the update processing unit is configured to perform an update process in consideration of the amount of electric power estimated by the required electric power estimation unit, the amount of electric power acquired by the battery level acquisition unit, and a priority level of the update program or data acquired by the update information acquisition unit;

wherein each of the communication devices is configured to receive the update program or data from the on-board update device, and to perform an update by storing the received update program or data in the storage unit; and wherein, if an update program or data is kept in the update storage unit, the update information acquisition unit is configured to decide whether to acquire a next update program or data from the device outside the vehicle, in consideration of a priority level of the update program or data kept in the update storage unit and free space on the update storage unit.

* * * * *